US 9,747,127 B1

(12) United States Patent
Florissi et al.

(10) Patent No.: US 9,747,127 B1
(45) Date of Patent: Aug. 29, 2017

(54) WORLDWIDE DISTRIBUTED JOB AND TASKS COMPUTATIONAL MODEL

(75) Inventors: Patricia G. S. Florissi, BriarCliff Manor, NY (US); Sudhir Vijendra, Cambridge, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 199 days.

(21) Appl. No.: 13/535,814

(22) Filed: Jun. 28, 2012

Related U.S. Application Data

(63) Continuation-in-part of application No. 13/435,009, filed on Mar. 30, 2012.

(51) Int. Cl.
| | |
|---|---|
| G06F 9/46 | (2006.01) |
| G06F 9/54 | (2006.01) |
| G06F 9/50 | (2006.01) |
| G06F 11/07 | (2006.01) |
| H04L 29/08 | (2006.01) |

(52) U.S. Cl.
CPC .............. *G06F 9/46* (2013.01); *G06F 9/5072* (2013.01); *G06F 9/54* (2013.01); *G06F 11/0709* (2013.01); *H04L 67/10* (2013.01)

(58) Field of Classification Search
None
See application file for complete search history.

(56) References Cited

U.S. PATENT DOCUMENTS

| | | | |
|---|---|---|---|
| 7,590,620 B1* | 9/2009 | Pike et al. | |
| 7,756,919 B1* | 7/2010 | Dean et al. | 709/201 |
| 8,190,610 B2* | 5/2012 | Dasdan et al. | 707/737 |
| 8,260,840 B1* | 9/2012 | Sirota | G06F 9/5061 370/216 |
| 8,356,050 B1* | 1/2013 | Olston | G06F 17/30896 707/769 |
| 8,549,518 B1* | 10/2013 | Aron | G06F 9/45558 718/1 |
| 8,935,232 B2* | 1/2015 | Abadi | G06F 17/30445 707/713 |
| 9,020,802 B1* | 4/2015 | Florissi | G06F 17/30194 703/22 |
| 9,158,843 B1* | 10/2015 | Florissi | H04L 67/1097 |
| 9,280,381 B1* | 3/2016 | Florissi | G06F 9/46 |
| 9,336,263 B2* | 5/2016 | Abadi | G06F 17/3038 |
| 9,338,218 B1* | 5/2016 | Florissi | H04L 67/10 |
| 9,378,053 B2* | 6/2016 | Cai | G06F 9/4843 |

(Continued)

OTHER PUBLICATIONS

Luo_Jun8_2011.pdf; Luo et al. "A Hierarchical Framework for Cross-Domain MapReduce Execution", Jun. 8, 2011; Proceedings of Emerging Computational Methods for the Life Sciences Workshop (ECMLS2011) of ACM HPDC 2011 conference, (total pp. 8, page#15-22).*

(Continued)

*Primary Examiner* — Hiren Patel
(74) *Attorney, Agent, or Firm* — Krishnendu Gupta

(57) ABSTRACT

Example embodiments of the present invention relate to a method, an apparatus, and a computer program product for performing file system activities across administrative boundaries between a plurality of file systems. The method includes receiving a worldwide job to perform on a plurality of file systems, managing the worldwide job, and receiving results of the worldwide job from the plurality of file systems.

20 Claims, 13 Drawing Sheets

(56) References Cited

U.S. PATENT DOCUMENTS

| | | | |
|---|---|---|---|
| 9,489,233 B1* | 11/2016 | Florissi | G06F 9/5072 |
| 2009/0276771 A1* | 11/2009 | Nickolov et al. | 717/177 |
| 2011/0161294 A1* | 6/2011 | Vengerov et al. | 707/637 |
| 2011/0161637 A1* | 6/2011 | Sihn et al. | 712/220 |
| 2011/0302151 A1* | 12/2011 | Abadi | G06F 17/30445 |
| | | | 707/714 |
| 2011/0302583 A1* | 12/2011 | Abadi et al. | 718/102 |
| 2011/0313973 A1* | 12/2011 | Srivas | G06F 17/30194 |
| | | | 707/634 |
| 2012/0311589 A1* | 12/2012 | Agarwal et al. | 718/102 |
| 2012/0317579 A1* | 12/2012 | Liu | 718/104 |
| 2013/0086355 A1* | 4/2013 | Narang et al. | 712/30 |
| 2013/0104135 A1* | 4/2013 | Cai | G06F 9/4843 |
| | | | 718/102 |
| 2013/0104140 A1* | 4/2013 | Meng et al. | 718/104 |

OTHER PUBLICATIONS

Dean_2004.pdf; Dean et al. "MapReduce: Simplified Data Processing on Large Clusters", 2004, Google Inc.; pp. 1-13.*

SunMicro_Hadoop_Aug7_2009.pdf; "Lustre with Hadoop white paper v0.4.2", Aug. 7, 2009, Sun MicroSystems Inc. pp. 1-27.*

Yang_2007.pdf; Yang et al. "Map-Reduce-Merge: Simplified Relational Data Processing on Large Clusters", Jun. 14, 2007, SIGMOD'07, Beijing, China. (Total pp. 12).*

Xie_2010.pdf; Xie et al. "Improving MapReduce Performance through Data Placement in Heterogeneous Hadoop Clusters", Copyright 2010, IEEE, pp. 1-9.*

* cited by examiner

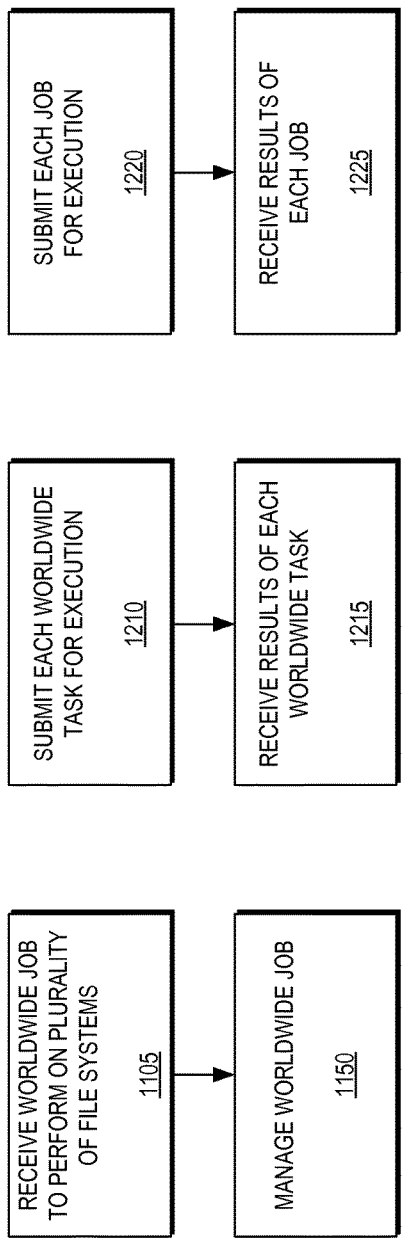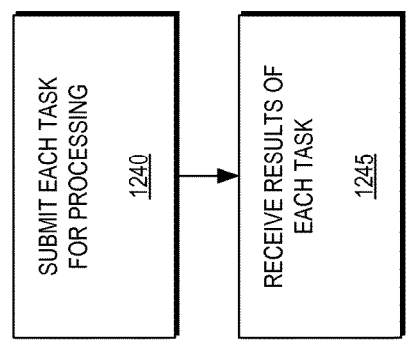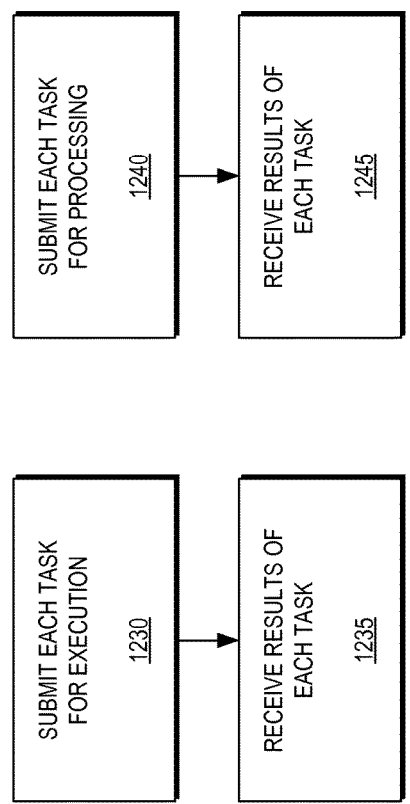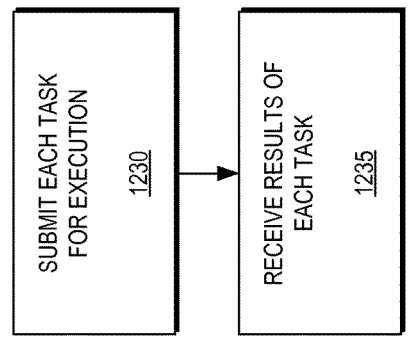

WORLDWIDE DISTRIBUTED JOB AND TASKS COMPUTATIONAL MODEL

CROSS REFERENCE TO RELATED APPLICATIONS

This Application is a Continuation-in-Part of U.S. patent application Ser. No. 13/435,009 entitled "BIOINFORMATICS CLOUDS AND BIG DATA ARCHITECTURE" filed on Mar. 30, 2012, the contents and teachings of which are incorporated herein by reference in their entirety, which application claims the benefit of U.S. Provisional Patent Application Ser. No. 61/578,757 entitled "BIOINFORMATICS CLOUDS AND BIG DATA ARCHITECTURE" filed on Dec. 21, 2011, the contents and teachings of which are incorporated herein by reference in their entirety.

This Application is related to U.S. patent application Ser. No. 13/535,684 entitled "WORLDWIDE DISTRIBUTED FILE SYSTEM MODEL", Ser. No. 13,535,696 entitled "WORLDWIDE DISTRIBUTED ARCHITECTURE MODEL AND MANAGEMENT", Ser. No. 13/535,712 entitled "EXECUTION FRAMEWORK FOR A DISTRIBUTED FILE SYSTEM", Ser. No. 13/535,731 entitled "PARALLEL MODELING AND EXECUTION FRAMEWORK FOR DISTRIBUTED COMPUTATION AND FILE SYSTEM ACCESS", Ser. No. 13/535,744 entitled "ADDRESSING MECHANISM FOR DATA AT WORLD WIDE SCALE", Ser. No. 13/535,760 entitled "SCALABLE METHOD FOR OPTIMIZING INFORMATION PATHWAY", Ser. No. 13/535,796 entitled "CO-LOCATED CLOUDS, VERTICALLY INTEGRATED CLOUDS, AND FEDERATED CLOUDS", and Ser. No. 13/535,821 entitled "DISTRIBUTED PLATFORM AS A SERVICE", filed on even date herewith, the contents and teachings of which are incorporated herein by reference in their entirety.

A portion of the disclosure of this patent document may contain command formats and other computer language listings, all of which are subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

This application relates to Big Data.

BACKGROUND

The amount of data in our world has been exploding. Companies capture trillions of bytes of information about their customers, suppliers, and operations, and millions of networked sensors are being embedded in the physical world in devices such as mobile phones and automobiles, sensing, creating, and communicating data. Multimedia and individuals with smartphones and on social network sites will continue to fuel exponential growth. Yet, the impact this growing amount of data will have is unclear.

SUMMARY

Example embodiments of the present invention relate to a method, an apparatus, and a computer program product for performing file system activities across administrative boundaries between a plurality of file systems. The method includes receiving a worldwide job to perform on a plurality of file systems, managing the worldwide job, and receiving results of the worldwide job from the plurality of file systems.

BRIEF DESCRIPTION OF THE DRAWINGS

The above and further advantages of the present invention may be better under stood by referring to the following description taken into conjunction with the accompanying drawings in which:

FIGS. 11-15 are flow diagrams illustrating example methods according to example embodiments of the present invention;

DETAILED DESCRIPTION

Figure 1:
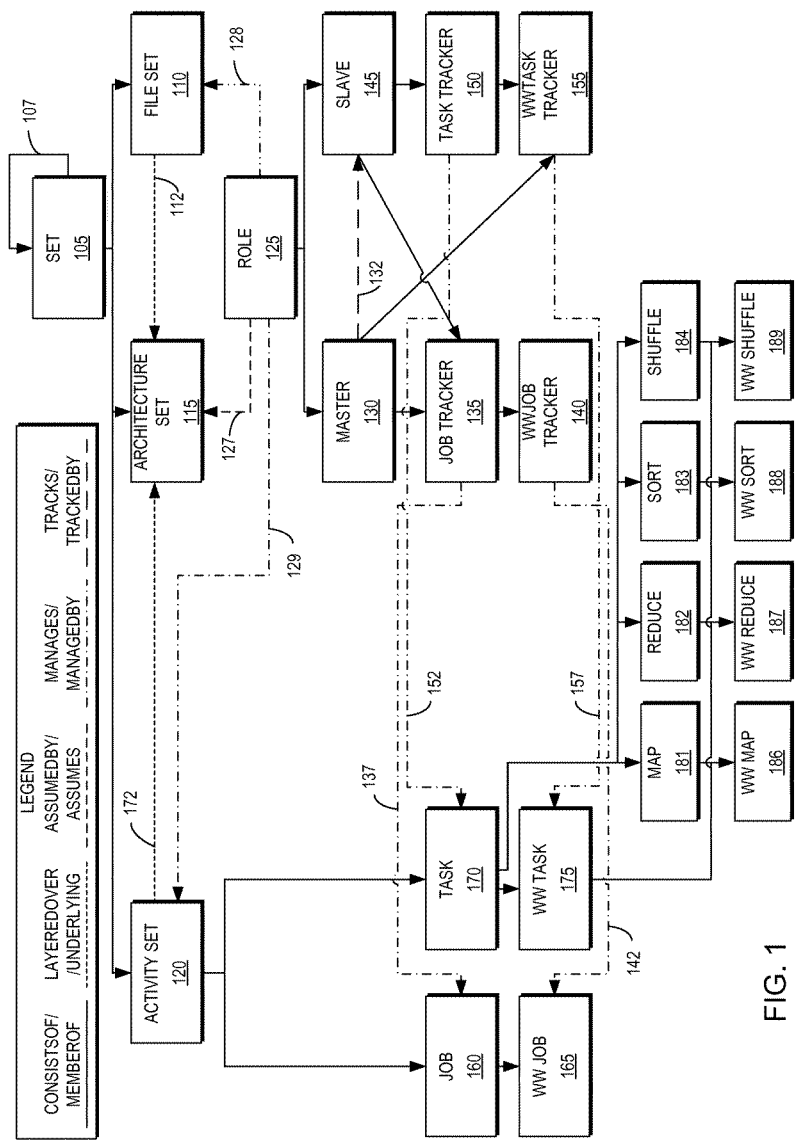
FIG. 1 is a block diagram illustrating relationships between various classes according to an example embodiment of the present invention.

Generally, the amount of data capture has grown in every area of global economy. Normally, companies are churning out increasing amounts of transactional data, capturing trillions of bytes of information about their customers, suppliers, and operations. Conventionally, millions of networked sensors embedded in the physical world in devices such as mobile phones, smart energy meters, automobiles, and industrial machines create data that is recorded and stored (computed, archived, analyzed . . . ). Usually, as companies and organizations generate a tremendous amount of digital data that are created as a by-product of their activities. Often, enterprises may be collecting data with greater granularity and frequency, capturing every customer transaction, attaching more personal information, and also collecting more information about consumer behavior in many different environments. Usually, this activity increases the need for more storage and analytical capacity.

Typically, social media sites, smartphones, and other consumer devices including PCs and laptops have allowed billions of individuals around the world to contribute to the amount of data available. Normally, consumers communicate, browse, buy, share, and search creating large amounts of consumer data. However, conventional techniques are not able to monitor or analyze this "Big Data." Generally, conventional modeling techniques do not accommodate for or do not model the properties that define Big Data. For example, conventional techniques may not be able to perform analysis on Big Data because of the sheer number and size of transaction that would be necessary to perform the analysis. As well, conventional techniques may consider elements as attributes of the data when, to properly represent the Big Data these "attributes" may need to be considered as properties of the Big Data.

Generally, the Hadoop framework focuses on Massive Parallel Processing (MPP) within the delimiters of a Cluster or data set. Usually, Hadoop assumes that data or Big Data has been transferred to a single cluster and has been evenly distributed across the nodes of the cluster. Typically, Hadoop does not enable analysis of data across multiple clusters. Conventionally, different parts of the Big Data may reside on different clusters potentially spread across different clouds. Usually, a retail enterprise may need to analyze its sales transactions over the last 5 years, but it may store last four years' transactions in a Public Cloud while retaining the last 12 months in its own Private Cloud. Generally, the enterprise does not have the storage, processing capacity or bandwidth, to repatriate the last four years worth of Big Data to its private cloud. In an embodiment, the current disclosure enables management of big data sets where the content may exist across numerous clouds or data storage centers. As used herein, for simplicity, the framework for Massive Parallel Processing (MPP) within the delimiters of a Cluster or data set may be referred to as Hadoop by way of example, however any framework may be used and the current techniques are not limited to use with Hadoop.

Generally, with respect to the data, there may be two architectural frameworks. Conventional architecture design may assume that there are three main types of hardware resources to be managed, servers, enclosing very expensive processors that should not be idle at any moment in time, storage Arrays, enclosing drives of different performance and capacity ranging from Solid State Drive (SSD) to Fiber Channel and SATA, and Storage Area Network (SAN), connecting a set of servers to a set of storage arrays. Generally, this architecture may assumes that most applications are "computing intensive" meaning that there will be high demand for processing power that performs computation on a subset of all the data available for the application, which may be transferred across the SAN to the servers.

Conventionally, a cluster type architecture assumes a flat commodity world, where processing cores and disk drives are cheap and abundant, even though they may and will fail often, applications are computing and data intensive, where computations may need to be done over the entire data set; and in processing Big Data, transfer time becomes the new bottleneck. Traditionally, a Cluster architecture may be based on a set of very simple components and assumes that there are hundreds or thousands of these components together, a node may comprise a set of processing cores attached to a set of disks, a rack may comprise a stack of nodes, and a cluster may comprise a group of racks. Conventionally, within the context of a Cluster, Big Data is typically divided into equal size blocks and the blocks are distributed across the disks in the nodes. Usually, the data in each node may processed by the processing cores in the node providing Data Locality where the data is collocated with the computing node;

Typically, distributed file systems may provide data in a data center to be split between nodes. Generally, a distributed file system may split, scatter, replicate and manage data across the nodes in a data center. Typically, a file system may be a distributed file system when it manages the storage across a network of machines and the files are distributed across several nodes, in the same or different racks or clusters. Conventionally, map reduce may be a computational mechanism to orchestrate the computation by dividing tasks, collecting and re-distributing intermediate results, and managing failures across all nodes in the data center. In certain embodiments, the current techniques may enable data to be split between nodes. In other embodiments, the current techniques may enable computation on data that has been split between nodes.

Conventionally, a distributed file system may consist of a set of equal size file blocks. Typically these file blocks may be multiples of a simple multiplier, such as 512 kb. Generally, file blocks may be the unit used to distribute parts of a file across disks in nodes. Usually, as disks in a node and nodes in a rack may fail, the same file block may be stored on multiple nodes across the cluster. Typically, the number of copies may be configured. Usually, the Name Node may decide in which disk each one of the copies of each one of the File Blocks may reside and may keep track of all that information in local tables in its local disks. Conventionally, when a node fails, the Name Node may identify the file blocks that have been affected; may retrieve copies of these file blocks from other healthy nodes; may find new nodes to store another copy of them, may store these other copies; and may update this information in its tables. Typically, when an application needs to read a file, it may connect to the Name Node to get the addresses for the disk blocks where the file blocks are and the application may then read these blocks directly without going through the Name Node anymore.

In some embodiments, "Big Data" may refer to a dataset that has a size, volume, analytical requirements, or structure demands larger than typical software tools may capture, store, manage, and analyze. In certain embodiments, "Big Data" may refer to a dataset that has a combination of attributes, such as size, volume, structure, or analytical requirements, with which typical software tools may not be able to work. In most embodiments, big data is not defined in terms of being larger than a certain number of terabytes rather, as technology advances over time, the size of datasets that qualify as big data may also increase. In certain embodiments, data transfer speed and number of transactions may also be attributes of Big Data.

In further embodiments, the definition of "Big Data" may vary by sector or industry, depending on what kinds of software tools are commonly available and what sizes of datasets are common in a particular industry. Big Data may refer to data from Digital Pathology, data from seismological surveys, data from the financial industry, and other types of data sets that are generally too large, for example in size or number of transactions, to be modeled and analyzed with conventional techniques.

Typically, organizations and business units share IT services, which may result in the creation of Big Data. Generally, the network, apps, and servers are shared and/or dedicated in many instances. Usually, of cloud and Big Data models and analytic platforms provide opportunities for the storage business. However, conventional file sizes vary depending on the verticals, domains and type of data. Conventionally solutions provide a good infrastructure to host files that are large in size, but not for smaller files.

Generally, Big Data is Multi Structured and may be conventionally stored, analyzed and managed each type of information in a number of different ways. In some embodiments, structured data may be stored in Block based, SQL, and RDBMS type databases. In other embodiments, semi-structured data may be stored in XML Data Files, in File Based systems, and in Hadoop Map Reduce. In further embodiments, quasi-structured data may be data containing some inconsistencies in data values and formats, e.g., Web click-stream data. In some embodiments, unstructured data may be text documents that could be subject to analytics over text or numbers such as file based data, Hadoop MapReduce, and HDFS data. In other embodiments, unstructured data may be images and video such as file based data, and data streamlined with technologies such as MapReduce, or Scale Out NAS data. Typically, it may be difficult to process information stored in all different formats, cross-analyze content, or visualize and gain insight into the important information spread all over the different formats.

In some embodiments, Worldwide Hadoop (WWH) or other big data processing methodologies may enable Massive Parallel Processing (MPP) to be executed across multiple clusters, and clouds without requiring one or more Big Data sets to be located at the same location. In certain embodiments, WWH may consist of a layer of orchestration on top of Hadoop or a similar architecture that manages the flow of operations across clusters of nodes. In other embodiments, the clusters maybe separate across metro or worldwide distances. In further embodiments, the current techniques may enable Worldwide Hadoop (WWH) to enable Genome Wide Analysis (GWA) of Genomes that reside on different Genome Banks, one located in NY and another located in MA.

In certain embodiments, Worldwide Hadoop may be applied where big data clouds exist. In certain embodiments, clouds may be extension of the other clouds. In other embodiments, clouds may be an independent cloud. In further embodiments, clouds may be providing an analysis services to other clouds. In some embodiments, the big data clouds may exchange raw data or analyze data for further processing. In certain embodiments, the domain expertise, open data, open science data, analysis etc, may come from different geographic locations and different clouds may host the respective big data. In at least some embodiments, the federation among big data clouds may present an internet infrastructure challenge. In some embodiments, factors like cost and bandwidth limit may affect the big data Hadoop deployment federation. In certain embodiments, the current techniques may model Hadoop environments. In other embodiments, the current techniques may re-define roles of the Hadoop components in the Hadoop clusters. In certain embodiments, Massive Parallel Processing may be enabled across clouds. In some embodiments, WWH concepts apply where there are many big data clouds, and the clouds may need to either exchange raw data or analyze data for further processing. In some embodiments, as used herein, a cluster may be used interchangeably with a data center.

Worldwide Distributed File System Computational Model

In most embodiments a worldwide distributed file system model or modeling structure may be used to present a worldwide distributed file system. In most embodiments, the worldwide distributed file system model may enable representation of one or more file systems as a worldwide distributed file system. In certain embodiments, this model may include file system blocks, files, file systems, domains and worldwide distributed file systems. It should be understood that, the file systems may be any kind of file system, such as Network File System (NFS), OneFS, Hadoop Distributed File System (HDFS), Global Data File System (GDFS) or any other file system being part of the domains/clusters within the world wide distributed file system. Further, it should be understood that the worldwide distributed file system may be set up as a homogeneous file system (i.e., only one type of file system across domains) or a heterogeneous file system (i.e., multiple types of file systems across domains).

In most embodiments, the classes, objects, and representations referenced herein may be an extension of known distributed system models, such as the EMC® (formerly Smarts®) Ionix® Common Information Model (ICIM) by EMC Corporation of Hopkinton, Mass., or similarly defined or pre-existing CIM-based model and adapted for the environmental distributed system, as will be discussed below. This exemplary model is an extension of the Distributed Management Task Force (DMTF)/Storage Management Initiative (SMI) model.

Model-based system representation is discussed in U.S. Pat. No. 5,528,516, entitled "APPARATUS AND METHOD FOR EVENT CORRELATION AND PROBLEM REPORTING;" U.S. Pat. No. 5,661,668, entitled "APPARATUS AND METHOD FOR ANALYZING AND CORRELATING EVENTS IN A SYSTEM USING A CAUSALITY MATRIX;" U.S. Pat. No. 6,249,755, entitled "APPARATUS AND METHOD FOR EVENT CORRELATION AND PROBLEM REPORTING;" U.S. Pat. No. 6,868,367, entitled "APPARATUS AND METHOD FOR EVENT CORRELATION AND PROBLEM REPORTING;" U.S. Pat. No. 7,003,433, entitled "APPARATUS AND METHOD FOR EVENT CORRELATION AND PROBLEM REPORTING;" and U.S. Pat. No. 7,107,185, entitled "APPARATUS AND METHOD FOR EVENT CORRELATION AND PROBLEM REPORTING," the contents and teachings of all of which are hereby incorporated herein by reference in their entirety. An example of a Big Data Set may be found in U.S. patent application Ser. No. 12/977,680, filed Dec. 23, 2010, entitled "INFORMATION AWARE DIFFERENTIAL STRIPING;" the contents and teachings of which are hereby incorporated herein by reference in their entirety. An example of modeling a Big Data Set may be found in U.S. patent application Ser. No. 13/249,330, filed Sep. 30, 2011, entitled "MODELING BIG DATA," the contents and teachings of which are hereby incorporated herein by reference in their entirety. An example of analyzing Big Data Set may be found in U.S. patent application Ser. No. 13/249,335, filed Sep. 30, 2011, entitled "ANALYZING BIG DATA," the contents and teachings of which are hereby incorporated herein by reference in their entirety. Each of the preceding applications and patents is commonly owned by EMC Corporation of Hopkinton, Mass.

In general, the preceding patents and patent applications disclose modeling of distributed systems by defining a plurality of network configuration non-specific representations of types of components (elements or devices) managed in a network and a plurality of network configuration non-specific representations of relations among the types of managed components and problems and symptoms associated with the components and the relationships. The configuration non-specific representations of components and relationships may be correlated with a specific Big Data set for which the associated managed component problems may propagate through the analyzed system and the symptoms associated with the data set may be detected an analyzed. An analysis of the symptoms detected may be performed to determine the root cause of the observed symptoms (i.e., the source of the problem). Other analysis, such as impact, fault detection, fault monitoring, performance, congestion, connectivity, interface failure, in addition to root-cause analysis, may similarly be performed based on the model principles described herein.

FIG. 1 is a block diagram illustrating relationships between various classes according to an example embodiment of the present invention. In the example embodiment of FIG. 1, directional dotted lines (e.g., ConsistsOf/MemberOf 107) may represent a relationship from one class or instance to another. In most embodiments, if the dotted line is bi-directional then the inverse relationship needed to traverse the classes may be written next to the relationship name with a '/' sign. In FIG. 1, unidirectional solid line 107 represents the class inheritance. In certain embodiments, the inherited class may be where the arrow in the line ends, and the other class may be the source class. In most embodiments, the inherited class inherits the methods and properties from the source class. In FIG. 1 and the figures that follow, classes are represented as solid-lined rectangular boxes with right-angle corners. Instances of a class are represented as solid-lined rectangular boxes with rounded corners.

As illustrated in FIG. 1, abstract classes defining the root of a distributed file system hierarchy are presented. In certain embodiments, the distributed file system may include a super Set 105. The Set 105 may be an abstract class representing entities that have the same properties of the mathematical construct Set. In other words, the Set 105 has the relationship that it may have other Sets 105. In certain embodiments, members of the class Set 105 may have a ConsistsOf relationship 107 with other members of the class Set 105. In most embodiments, the inverse relationship of ConsistsOf is MemberOf 107. In some embodiments, the class Set 105 may be the root of the WWH worldwide distributed file system model. In at least some embodiments, the class Set 105 may define ConsistsOf and MemberOf relationships 107 to itself 105. In further embodiments, the class Set 105 may have many inherited classes. In certain embodiments, the inherited classes may add or override methods, properties and relationships.

Continuing one level deeper in the modeling tree, a subclass of a Set 105 is a File Set 110, which is an abstract class representing entities that, in addition to exhibiting the properties of the class Set 105, describe component properties associated with how the distributed file system represents and manages data. In other words, a File Set 110 is a class that collects data. Members of the subclass File Set 110 may have a LayeredOver relationship 112 with members of the class ArchitectureSet 115, indicating that these members of the File Set class 110 reside (i.e., are hosted) or utilize the related members of the Architecture Set class 115. The LayeredOver relationship 112 is described in greater details in U.S. patent application Ser. No. 13/435,009, filed Mar. 30, 2012, entitled "WORLDWIDE DISTRIBUTED ARCHITECTURE MODEL AND MANAGEMENT," the contents and teachings of which are hereby incorporated herein by reference in their entirety.

Another subclass of a Set 105 is an Activity Set 120, which is an abstract class representing entities that, in addition to exhibiting the properties of the class Set 105, describe activities (e.g., applications, tasks, jobs) to be run on components of the Architecture Set 115. Members of the Activity Set class 120 may have a LayeredOver relationship 172 with members of the class Architecture Set 115, indicating that Activity Set 120 instances run (i.e., execute) on the related members of the Architecture Set class 115. Further, through inheritance from the class Set 105, members of the Activity Set class may have a ConsistsOf relationship (not shown) with other members of the same class 120, indicating that an activity may ConsistOf other sub-activities. Similarly, members of the ActivitySet class 120 may have a MemberOf relationship (not shown) with other members of the same class 120, indicating that an activity may be a sub-activity of a bigger activity. Moreover, as will be described below in greater detail, members of the Activity Set class 120 may have a relationship ManagedBy 129 with instances of the class Role 125, indicating that the instance of the class Role 125 "manages" the activity represented by the related instance of the class Activity Set 120.

Hadoop's MapReduce functions recognize several types of activities, such as Job 160 and Task 170, which may be members of the Activity Set class 120. Class Task 170 is an abstract class representing entities that, in addition to exhibiting the properties of the Activity Set class 120, describe an activity that is part of a bigger activity (i.e., a task may be a subunit of work), typically a Job 160, described below in greater detail. In certain embodiments, a Task 170 may receive as input part of a bigger data set and execute a function on that piece of data. Class Job 160 is an abstract class representing entities that, in addition to exhibiting the properties of the Activity Set class 120, describe a self-contained activity that accepts a well define input and will return a well defined output. For example, in the context of Hadoop, a Job 160 represents an activity that can be executed on data (e.g., Big Data) where parts of the data are stored on disks inside Nodes of a Cluster, described below in greater detail with reference to FIG. 2. For example, a Job 160 may consist of Tasks 160, and some of these Tasks 160 may be executed in parallel on the different parts of the data.

As illustrated in FIG. 1, MapReduce defines Map 181 and Reduce 182 activities as types of Tasks 160. Class Map 181 is an abstract class representing entities that, in addition to exhibiting the properties of the Task class 160, describe an activity that, for example, takes as input a Mapper function and the pointer to data and it returns a list of <key, value> pairs. For <key, value> pairs with the same key, it may return a <key, <value-list>> pair, where <value-list> consists of a list of comma separated values. Further, class Reduce 182 is an abstract class representing entities that, in addition to exhibiting the properties of the Task class 160, describe an activity that, for example, takes as input a Reduce function and a list of <key, value> pairs, and returns another list of <key, value> pairs. For <key, value> pairs with the same key, it may return a <key, <value-list>> pair, where <value-list> consists of a list of comma separated values.

MapReduce also defines Sort 183 and Shuffle 184 activities as types of Tasks 160. Class Sort 183 is an abstract class representing entities that, in addition to exhibiting the properties of the Task class 160, describe an activity that, for example, takes as input a list of <key, value> pairs and a sorting function, and returns a list of <key, value> pairs that have been sorted. There are many types of sort functions. Some may sort only based on the key, others may sort first on the key and then on the value. For <key, value> pairs with the same key, it may return a <key, <value-list>> pair where <value-list> consists of a list of comma separated values. Further, class Shuffle 184 is an abstract class representing entities that, in addition to exhibiting the properties of the Task Set, describe, for example, an activity that takes as input a shuffle function and a list of <key, value> pairs, and returns a <key, <value-list>> pair, where <value-list> comprises a list of comma separated values. In certain embodiments there is only one entry per key. This activity may call Sort 183 to first sort the <key, value> pairs and then it shuffles together the values for the same key.

Figure 2:
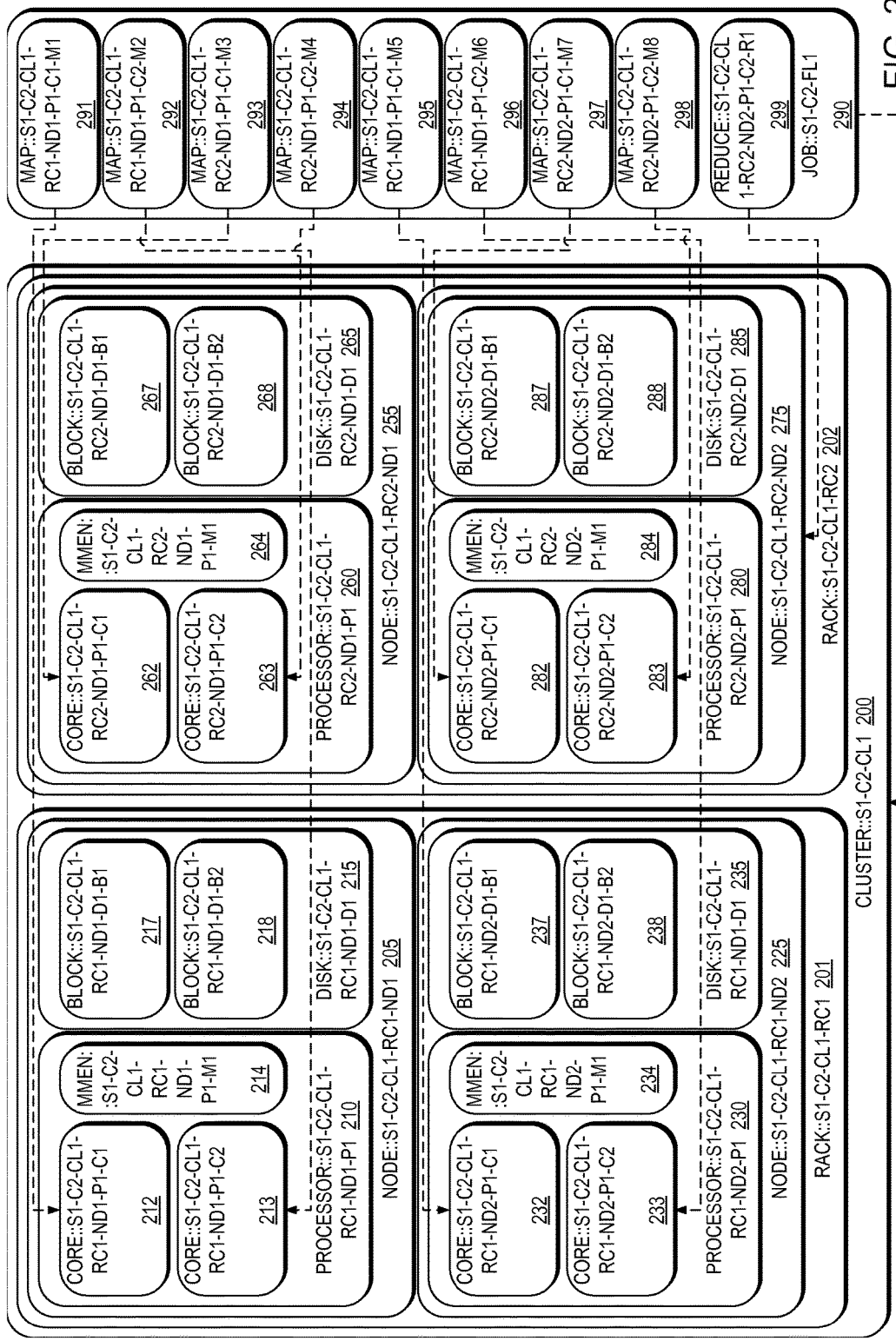
FIGS. 2-3 are block diagrams illustrating relationships between a Cluster, comprising two Racks, each rack comprising two Nodes, and computational tasks of a Job assigned to each Node according to an example embodiment of the present invention.

FIG. 2 is a block diagram illustrating relationships between a Cluster S1-C2CL1 200 and computational Tasks 291-299 of a Job 290. As illustrated in FIG. 2, two views of a system are presented.

On the left, for example, a physical view is presented of the Cluster 200 comprising two Racks S1-C2-CL1-RC1 201, S1-C2-CL1-RC2 202 each comprising two Nodes (e.g., Rack S1-C2-CL1-RC1 201 comprises Nodes S1-C2-CL1-RC1-ND1 205 and S1-C2-CL1-RC1-ND2 225 and Rack S1-C2-CL1-RC2 202 comprises nodes S1-C2-CL1-RC2-ND1 255 and S1-C2-CL1-RC2-ND2 275). In the example embodiment illustrated in FIG. 2, each Node 205, 225, 255, 275 comprises a Processor having two Cores and Memory and a Disk having two Blocks (e.g., Node S1-C2-CL1-RC1-ND1 205 comprises Processor S1-C2-CL1-RC1-ND1-P1 210 having Cores S1-C2-CL1-RC1-ND1-P1-C1 212 and S1-C2-CL1-RC1-ND1-P1-C2 213 and Memory S1-C2-CL1-RC1-ND1-P1-M1 214 and Disk S1-C2-CL1-RC1-ND1-D1 215 having Blocks S1-C2-CL1-RC1-ND1-D1-B1 217 and S1-C2-CL1-RC1-ND1-D1-B2 218, Node S1-C2-CL1-RC1-ND2 225 comprises Processor S1-C2-CL1-RC1-ND2-P1 230 having Cores S1-C2-CL1-RC1-ND2-P1-C1 232 and S1-C2-CL1-RC1-ND2-P1-C2 233 and Memory S1-C2-CL1-RC1-ND2-P1-M1 234 and Disk S1-C2-CL1-RC1-ND2-D1 235 having Blocks S1-C2-CL1-RC1-ND2-D1-B1 237 and S1-C2-CL1-RC1-ND2-D1-B2 238, Node S1-C2-CL1-RC2-ND1 255 comprises Processor S1-C2-CL1-RC2-ND1-P1 260 having Cores S1-C2-CL1-RC2-ND1-P1-C1 262 and S1-C2-CL1-RC2-ND1-P1-C2 263 and Memory S1-C2-CL1-RC2-ND1-P1-M1 264 and Disk S1-C2-CL1-RC2-ND1-D1 265 having Blocks S1-C2-CL1-RC2-ND1-D1-B1 267 and S1-C2-CL1-RC2-ND1-D1-B2 268, and Node S1-C2-CL1-RC2-ND2 275 comprises Processor S1-C2-CL1-RC2-ND2-P1 280 having Cores S1-C2-CL1-RC2-ND2-P1-C1 282 and S1-C2-CL1-RC2-ND2-P1-C2 283 and Memory S1-C2-CL1-RC2-ND2-P1-M1 284 and Disk S1-C2-CL1-RC2-ND2-D1 285 having Blocks S1-C2-CL1-RC2-ND2-D1-B1 287 and S1-C2-CL1-RC2-ND2-D1-B2 288).

On the right, for example, activities (i.e., Map and Reduce functions) 291-299 associated with a Job 290 are presented. As illustrated in FIG. 2, the Tasks 291-299 (e.g., Map functions 291-298 and Reduce function 299) are performed on the respective Cores of the respective Processors at the respective Nodes (e.g., Map function S1-C2-CL1-RC1-ND1-P1-C1-M1 291 is performed on Core S1-C2-CL1-RC1-ND1-P1-C1 212 of Processor S1-C2-CL1-RC1-ND1-P1 210 of Node S1-C2-CL1-RC1-ND1 205, Map function S1-C2-CL1-RC1-ND1-P1-C1-M1 291 is performed on Core S1-C2-CL1-RC1-ND1-P1-C1 212 of Processor S1-C2-CL1-RC1-ND1-P1 210 of Node S1-C2-CL1-RC1-ND1 205, Map function S1-C2-CL1-RC1-ND1-P1-C2-M2 292 is performed on Core S1-C2-CL1-RC1-ND1-P1-C2 213 of Processor S1-C2-CL1-RC1-ND1-P1 210 of Node S1-C2-CL1-RC1-ND1 205, Map function S1-C2-CL1-RC2-ND1-P1-C1-M3 293 is performed on Core S1-C2-CL1-RC2-ND1-P1-C1 262 of Processor S1-C2-CL1-RC2-ND1-P1 260 of Node S1-C2-CL1-RC2-ND1 255, Map function S1-C2-CL1-RC2-ND1-P1-C2-M4 294 is performed on Core S1-C2-CL1-RC2-ND1-P1-C2 263 of Processor S1-C2-CL1-RC2-ND1-P1 260 of Node S1-C2-CL1-RC2-ND1 255, Map function S1-C2-CL1-RC1-ND2-P1-C1-M5 295 is performed on Core S1-C2-CL1-RC1-ND2-P1-C1 232 of Processor S1-C2-CL1-RC1-ND2-P1 230 of Node S1-C2-CL1-RC1-ND2 225, Map function S1-C2-CL1-RC1-ND2-P1-C2-M6 296 is performed on Core S1-C2-CL1-RC1-ND2-P1-C2 233 of Processor S1-C2-CL1-RC1-ND2-P1 230 of Node S1-C2-CL1-RC1-ND2 225, Map function S1-C2-CL1-RC2-ND2-P1-C1-M7 297 is performed on Core S1-C2-CL1-RC2-ND2-P1-C1 282 of Processor S1-C2-CL1-RC2-ND2-P1 280 of Node S1-C2-CL1-RC2-ND2 275, and Map function S1-C2-CL1-RC2-ND2-P1-C2-M8 298 is performed on Core S1-C2-CL1-RC2-ND2-P1-C2 283 of Processor S1-C2-CL1-RC2-ND2-P1 280 of Node S1-C2-CL1-RC2-ND2 275). Similarly, the Reduce function 299 is performed, for example, by Node S1-C2-CL1-RC2-ND2 2775, with Job 290 being performed by the Cluster S1-C2-CL1 200.

It should be understood that, for the figures that follow, this sample topology can also be represented using the LayeredOver relationship at the node level and not necessarily at the Core level.

Returning to FIG. 1, the Role class 125 may be extended to include a Manages relationship with the Activity Set class 120. For example, members of the Role class 125 may have a relationship Manages with instances of the class Activity Set 120, indicating that the instance of the class Role 125 "Manages" the activity represented by the related instance of the class Activity Set 120. As illustrated in FIG. 1, two types of Roles 125 are Master 130 and Slave 145.

An example Master 130 Role is JobTracker 135, which may be an application that Manages a Job 160. JobTracker 135 is an abstract class representing entities that, in addition to exhibiting the properties of a Master class 130, Manage one or more Jobs 150. Instances of the JobTracker class 135 may split a Job 160 into a series of Tasks 160, and assign each Task 170 to a TaskTracker 150 (described in greater detail below), which reports status back to the JobTracker 135. Typically, the JobTracker 135 maintains records of all sub-activities executed as part of the Job 160 and edit logs to capture the activities. Members of the JobTracker class 135 may have a Manages relationship 137 with members of the class Job 160, indicating that the instance of JobTracker 135 actually "Manages" the related instance of the class Job 160. Further, as described below in greater detail with reference to FIG. 5, members of the JobTracker class 135 may have a Tracks relationship 132 (i.e., inherited from the Master class 130) (e.g., Tracks relationship 531-534 of FIG. 5) with members of the class TaskTracker 150, indicating that the instance of the JobTracker class 135 actually "Tracks" the related instance of the class TaskTracker 150.

Similarly, an example Slave 145 role is the TaskTracker class 150, which may be an application that Manages a Task 170. TaskTracker 150 is an abstract class representing entities that, in addition to exhibiting the properties of a Slave class 145, Manage one or more Tasks 160. Members of the TaskTracker class 150 may have a Manages 152 relationship with members of the class Task 170, indicating that the instance of the TaskTracker class 150 actually "Manages" the related instance of the class Task 170. Further, as described below in greater detail with reference to FIG. 5, members of the TaskTracker class 150 may have a TrackedBy 132 relationship (i.e., inherited from the Slave class 145) (e.g., TrackedBy relationship 531-534 of FIG. 5) with members of the class JobTracker 135, indicating that the instance of the TaskTracker class 150 actually is "Tracked By" the related instance of the class JobTracker 135.

In certain embodiments, the Manages relationship 137, 152 may be refined such that the JobTracker class 135 only manages instances of the class Job 160 and the TaskTracker class 150 only manages instances of the class Task 170.

The architecture abstractions and role abstractions for Trackers (e.g., JobTrackers and TaskTrackers) then may be reconciled. The relationship Assumes, and its inverse Assumed By, represent the different roles taken by the different architectural components. For example, a relationship Assumes between an instance of the class Architecture Set 115 and an instance of the class Role 125 indicates that the instance of the Architecture Set class 115 is executing the functions associated with the related instance of the class Role 125.

Figure 3:
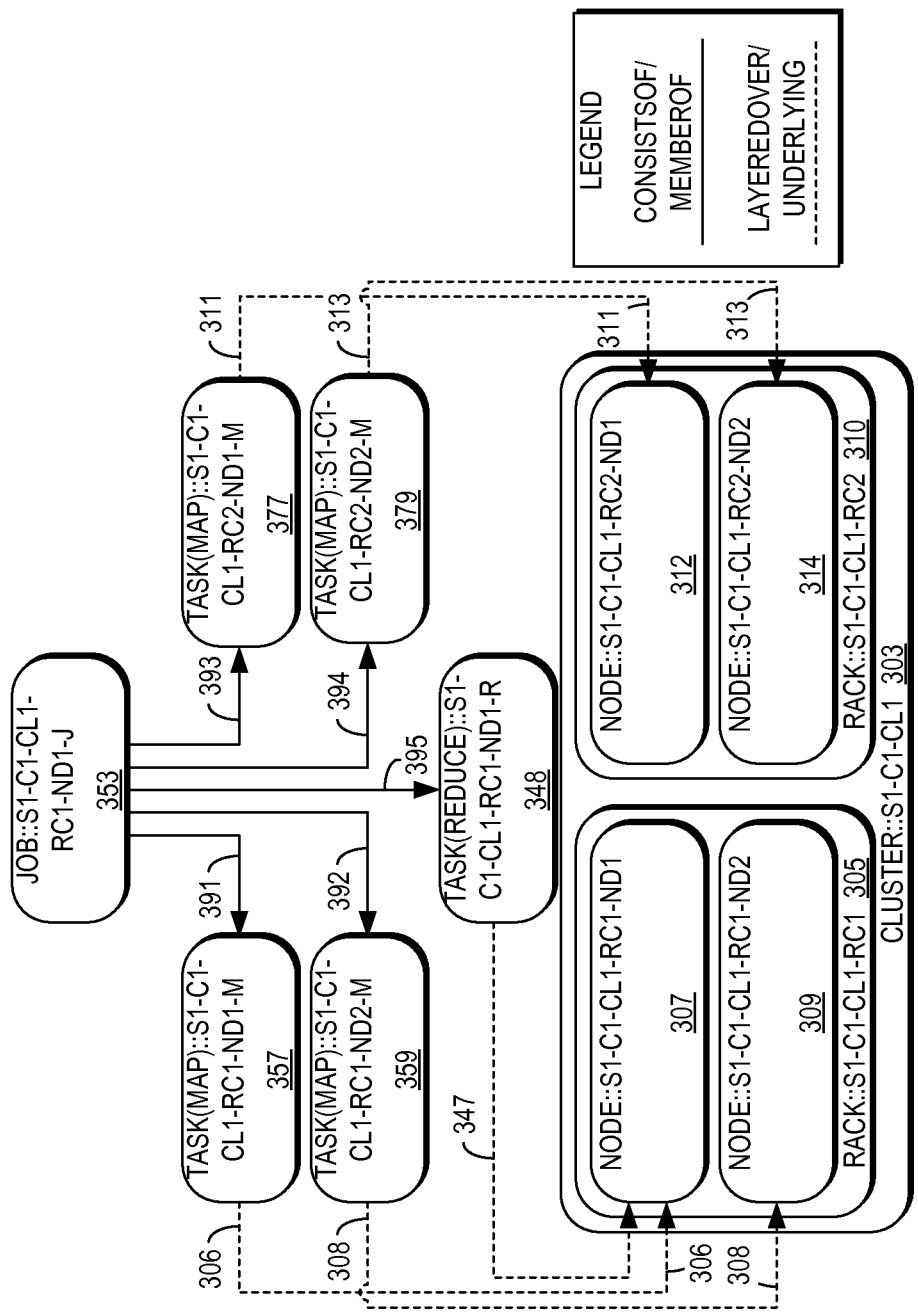

FIG. 3 is a block diagram illustrating relationships between a Cluster S1-C1-CL1 303 and computational Tasks 348, 357, 359, 377, 379 of a Job 353 according to an example embodiment of the present invention. In certain embodiments, the Cluster S1-C1-CL1 303 may comprise Racks (e.g., Rack S1-C1-CL1-RC1 305 and Rack S1-C1-CL1-RC2 310), each comprising respective sets of Nodes (e.g., Node S1-C1-CL1-RC1-ND1 307, Node S1-C1-CL1-RC1-ND2 309, Node S1-C1-CL1-RC2-ND1 312, and Node S1-C1-CL1-RC2-ND2 314).

As illustrated in FIG. 3, a Job S1-C1-CL1-RC1-ND1-J 353 ConsistsOf 391-395 five Tasks (e.g., Job S1-C1-CL1-RC1-ND1-J 353 ConsistsOf 391 Task(Map) S1-C1-CL1-RC1-ND1-M 357, Job S1-C1-CL1-RC1-ND1-J 353 ConsistsOf 392 Task(Map) S1-C1-CL1-RC1-ND2-M 359, Job S1-C1-CL1-RC1-ND1-J 353 ConsistsOf 393 Task(Map) S1-C1-CL1-RC2-ND1-M 377, Job S1-C1-CL1-RC1-ND1-J 353 ConsistsOf 394 Task(Map) S1-C1-CL1-RC2-ND2-M 379, and Job S1-C1-CL1-RC1-ND1-J 353 ConsistsOf 395 Task(Reduce) S1-C1-CL1-RC1-ND1-R 348.

Each of these computational Tasks 348, 357, 359, 377, 379 may be executed on various resources in the Cluster S1-C1-CL1-303 (e.g., Task(Map) S1-C1-CL1-RC1-ND1-M 357 may be LayeredOver 306 Node S1-C1-CL1-RC1-ND1 307, Task(Map) S1-C1-CL1-RC1-ND2-M 359 may be LayeredOver 308 Node S1-C1-CL1-RC1-ND2 309, Task(Map) S1-C1-CL1-RC2-ND1-M 377 may be LayeredOver 311 Node S1-C1-CL1-RC2-ND1 312, Task(Map) S1-C1-CL1-RC2-ND2-M 379 may be LayeredOver 313 Node S1-C1-CL1-RC2-ND2 314, and Task(Reduce) S1-C1-CL1-RC1-ND1-R 348 may be LayeredOver 347 Node S1-C1-CL1-RC1-ND1 307.

Figure 4:
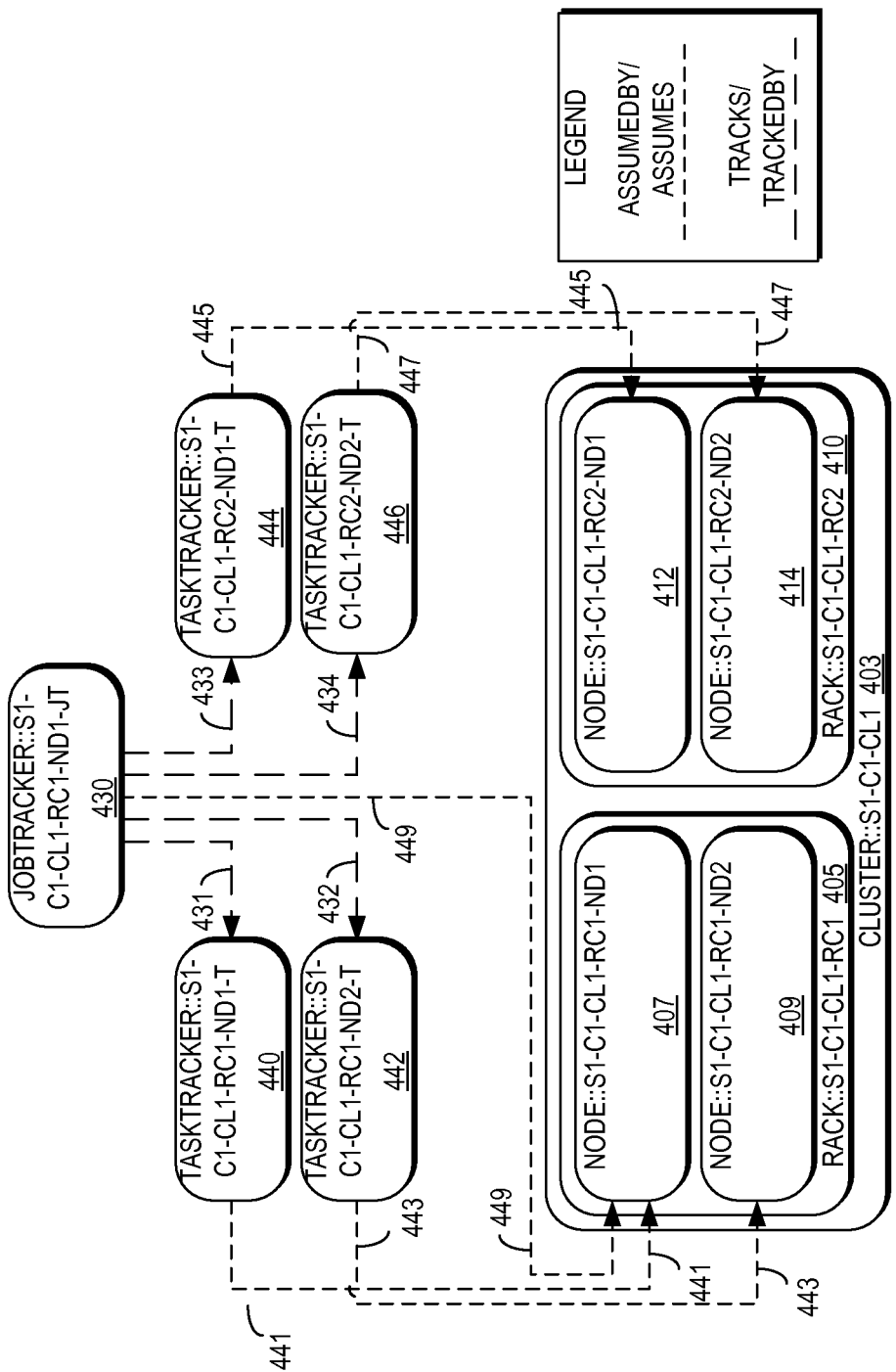
FIG. 4 is a block diagram illustrating relationships between of a Cluster, comprising two Racks, each rack comprising two Nodes, and Tracker (i.e., JobTracker and TaskTracker) functions assumed by the Nodes according to an example embodiment of the present invention.

FIG. 4 is a block diagram illustrating relationships between a Cluster S1-C1-CL1 403 and Roles that may be assumed by the Nodes 407, 409, 412, 414 in the Cluster 403. In certain embodiments, the Cluster S1-C1-CL1 403 may comprise Racks (e.g., Rack S1-C1-CL1-RC1 405 and Rack S1-C1-CL1-RC2 410), each comprising respective sets of Nodes (e.g., Node S1-C1-CL1-RC1-ND1 407, Node S1-C1-CL1-RC1-ND2 409, Node S1-C1-CL1-RC2-ND1 412, and Node S1-C1-CL1-RC2-ND2 414).

As illustrated in FIG. 4, the JobTracker S1-C1-CL1-RC1-ND1-JT 430 Role (i.e., to Manage Job S1-C1-CL1-FL1 553 as described in greater detail below with respect to FIG. 5) may be AssumedBy 449 Node S1-C1-CL1-RC1-ND1 407. In other words, the processes associated with the JobTracker S1-C1-CL1-RC1-ND1-JT 430 may be running on Node S1-C1-CL1-RC1-ND1 407. Similarly, the TaskTrackers 440, 442, 444, 446 may be running on the Nodes 407, 409, 412, 414 (e.g., TaskTracker S1-C1-CL1-RC1-ND1-T 440 may be AssumedBy 441 Node S1-C1-CL1-RC1-ND1 407, TaskTracker C1-CL1-RC1-ND2-T 442 may be AssumedBy 443 Node S1-C1-CL1-RC1-ND2 409, TaskTracker C1-CL1-RC2-ND1-T 444 may be AssumedBy 445 Node S1-C1-CL1-RC1-ND1 412, and TaskTracker C1-CL1-RC2-ND2-T 446 may be AssumedBy 447 Node S1-C1-CL1-RC2-ND2 414).

As described above with respect to FIG. 1, the JobTracker 430 Tracks 431-434 each of the TaskTrackers 440, 442, 444, 446 (i.e., JobTracker S1-C1-CL1-RC1-ND1-JT 430 Tracks 431 TaskTracker S1-C1-CL1-RC1-ND1-T 440, JobTracker S1-C1-CL1-RC1-ND1-JT 430 Tracks 432 TaskTracker S1-C1-CL1-RC1-ND2-T 442, JobTracker S1-C1-CL1-RC1-ND1-JT 430 Tracks 433 TaskTracker S1-C1-CL1-RC2-ND1-T 444, and JobTracker S1-C1-CL1-RC1-ND1-JT 430 Tracks 434 TaskTracker S1-C1-CL1-RC2-ND2-T 446).

Figure 5:
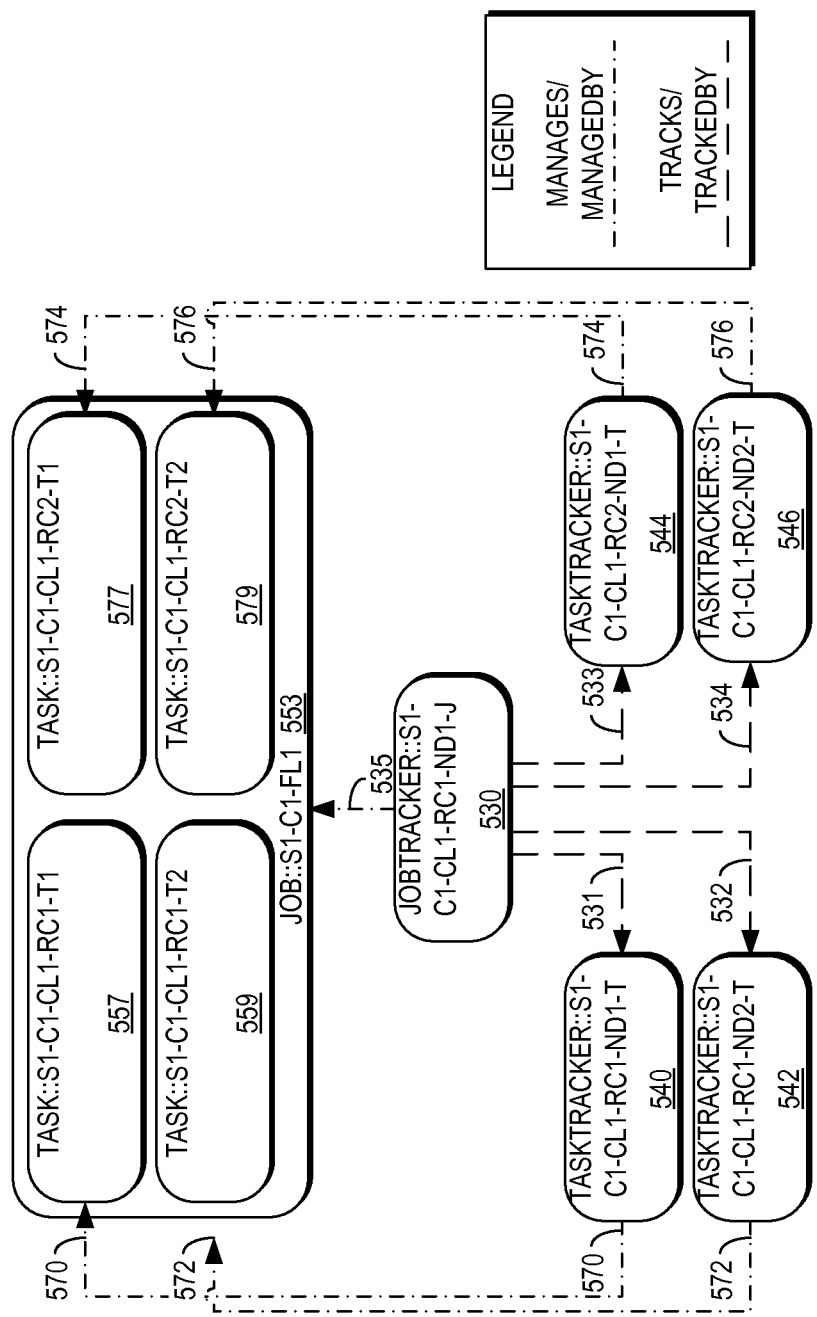
FIG. 5 is a block diagram illustrating relationships between Tasks of a Job and Tracker (i.e., JobTracker and TaskTracker) functions according to an example embodiment of the present invention.

FIG. 5 is a block diagram illustrating relationships between Tasks 557, 559, 577, 579 of a Job 553 and Tracker (i.e., JobTracker and TaskTracker) functions 530, 540, 542, 544, 546 according to an example embodiment of the present invention.

As illustrated in FIG. 5, the JobTracker S1-C1-CL1-RC1-ND1-JT 530 Manages 535 Job S1-C1-FL1 553. Similarly, the TaskTrackers 540, 542, 544, 546 Manage 531, 532, 533, 534 Tasks 557, 559, 577, 579 (i.e., TaskTracker S1-C1-CL1-RC1-ND1-T 542 Tracks 532 Task S1-C1-CL1-RC1-T1 507-T, TaskTracker S1-C1-CL1-RC1-ND2-T 540 Tracks 531 Task S1-C1-CL1-RC1-T2 509-T, TaskTracker S1-C1-CL1-RC2-ND1-T 546 Tracks 534 Task S1-C1-CL1-RC2-T2 514-T, and TaskTracker S1-C1-CL1-RC2-ND2-T 544 Tracks 533 Task S1-C1-CL1-RC2-T2 514-T). As described above with respect to FIGS. 1 and 4, the JobTracker 530 Tracks 531-534 each of the TaskTrackers 540, 542, 544, 546 (i.e., JobTracker S1-C1-CL1-RC1-ND1-JT 530 Tracks 531 TaskTracker S1-C1-CL1-RC1-ND1-T 540, JobTracker S1-C1-CL1-RC1-ND1-JT 530 Tracks 532 TaskTracker S1-C1-CL1-RC1-ND2-T 542, JobTracker S1-C1-CL1-RC1-ND1-JT 530 Tracks 533 TaskTracker S1-C1-CL1-RC2-ND1-T 544, and JobTracker S1-C1-CL1-RC1-ND1-JT 530 Tracks 534 TaskTracker S1-C1-CL1-RC2-ND2-T 546).

Figure 6:
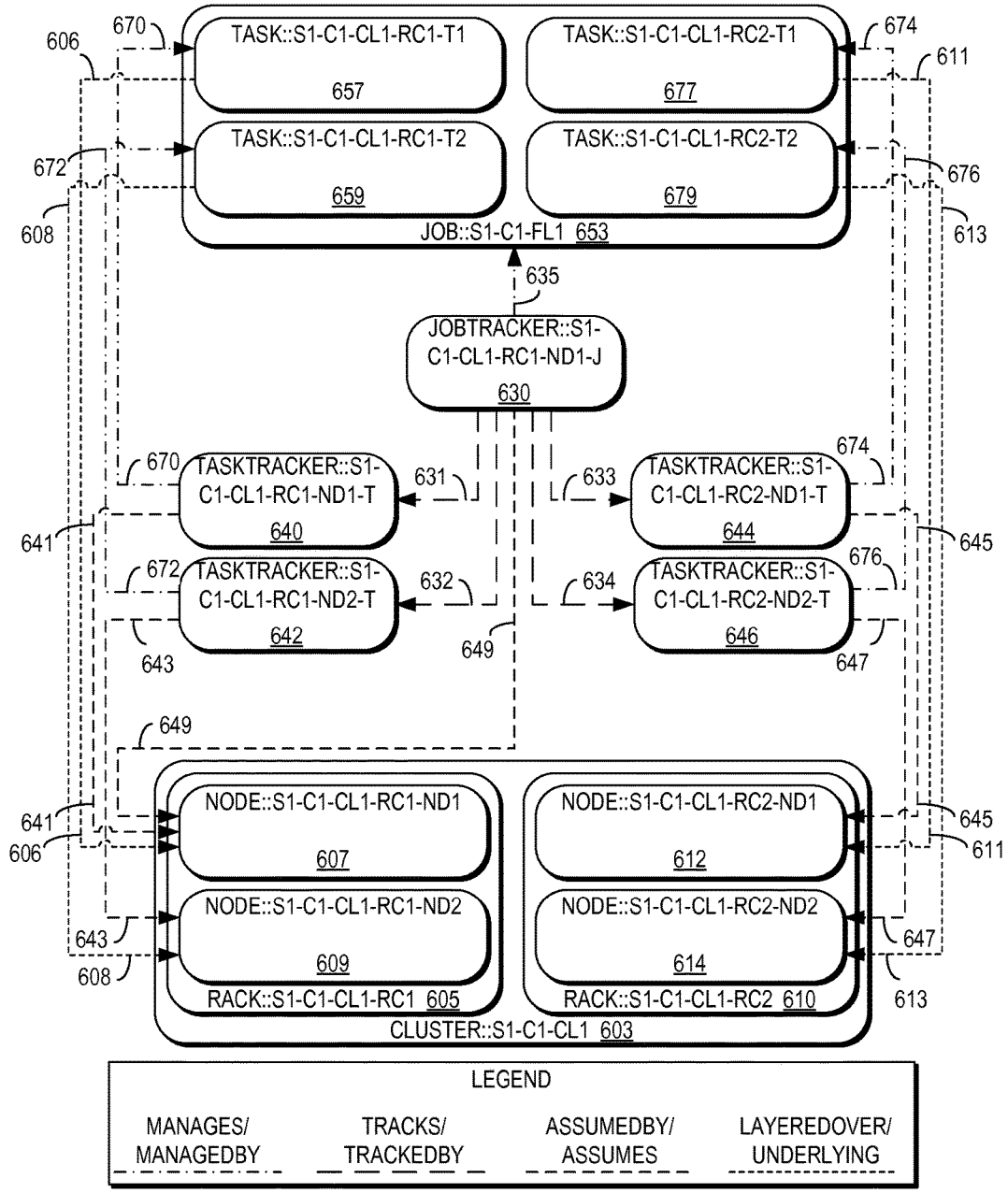
FIG. 6 is a block diagram illustrating relationships between Tasks of a Job and Tracker (i.e., JobTracker and TaskTracker) functions and between the Tracker functions and a Cluster, comprising two Racks, each Rack comprising two Nodes according to an example embodiment of the present invention.

FIG. 6 is a block diagram combining FIGS. 3-5 illustrating relationships between Tasks of a Job, Tracker (i.e., JobTrackers and TaskTracker) functions, and a Cluster according to an example embodiment of the present invention. In certain embodiments, the Cluster S1-C1-CL1 603 may comprise Racks (e.g., Rack S1-C1-CL1-RC1 605 and Rack S1-C1-CL1-RC2 610), each comprising respective sets of Nodes (e.g., Node S1-C1-CL1-RC1-ND1 607, Node S1-C1-CL1-RC1-ND2 609, Node S1-C1-CL1-RC2-ND1 612, and Node S1-C1-CL1-RC2-ND2 614).

As illustrated in FIG. 6, the JobTracker S1-C1-CL1-RC1-ND1-JT 630 Role may be AssumedBy 649 Node S1-C1-CL1-RC1-ND1 607. In other words, the processes associated with the JobTracker S1-C1-CL1-RC1-ND1-JT 630 may be running on Node S1-C1-CL1-RC1-ND1 607. Similarly, the TaskTrackers 640, 642, 644, 646 may be running on the Nodes 607, 609, 612, 614 (e.g., TaskTracker C1-CL1-RC1-ND1-T 640 may be AssumedBy 641 Node S1-C1-CL1-RC1-ND1 607, TaskTracker C1-CL1-RC1-ND2-T 642 may be AssumedBy 643 Node S1-C1-CL1-RC1-ND2 609, TaskTracker C1-CL1-RC2-ND1-T 644 may be AssumedBy 645 Node S1-C1-CL1-RC1-ND1 612, and TaskTracker C1-CL1-RC2-ND2-T 646 may be AssumedBy 647 Node S1-C1-CL1-RC2-ND2 614).

As described above with respect to FIGS. 1 and 4, the JobTracker 630 Tracks 631-634 each of the TaskTrackers 640, 642, 644, 646 (e.g., JobTracker S1-C1-CL1-RC1-ND1-JT 630 Tracks 631 TaskTracker S1-C1-CL1-RC1-ND1-T 640, JobTracker S1-C1-CL1-RC1-ND1-JT 630 Tracks 632 TaskTracker S1-C1-CL1-RC1-ND2-T 642, JobTracker S1-C1-CL1-RC1-ND1-JT 630 Tracks 633 TaskTracker S1-C1-CL1-RC2-ND1-T 644, and JobTracker S1-C1-CL1-RC1-ND1-JT 630 Tracks 634 TaskTracker S1-C1-CL1-RC2-ND2-T 646).

Further, the JobTracker S1-C1-CL1-RC1-ND1-JT 630 Manages 635 Job S1-C1-FL1 653. Similarly, the TaskTrackers 640, 642, 644, 646 Manage 670, 672, 674, 676 Tasks 657, 659, 677, 679 (e.g., TaskTracker S1-C1-CL1-RC1-ND1-T 640 Tracks 670 Task S1-C1-CL1-RC1-T1 657, TaskTracker S1-C1-CL1-RC1-ND2-T 642 Tracks 672 Task S1-C1-CL1-RC1-T2 659, TaskTracker S1-C1-CL1-RC2-ND1-T 644 Tracks 674 Task S1-C1-CL1-RC2-T2 677, and TaskTracker S1-C1-CL1-RC2-ND2-T 646 Tracks 676 Task S1-C1-CL1-RC2-T2 679).

Referring back to FIG. 1, the model of FIG. 1-6 may be extended to represent Worldwide entities (i.e., Worldwide Jobs (WWJobs) and Worldwide Tasks (WWTasks)).

The WWTask class 165 is an abstract class representing entities that, in addition to exhibiting the properties of the Task class 160, can be referenced outside the context of a Cluster and is typically part of a WWJob 165. A WWTask 170 typically receives as input, part of a bigger data set, typically defined as a Domain, and executes a function on that piece of data. It is important to note that Task 170 typically works on part of a File managed by a Distributed File System, while WWTask 175 works on part of a File that is part of a Domain. Domains and File Systems are described in greater detail in copending U.S. patent application Ser. No. 13/535,684, filed on even date herewith, entitled "WORLDWIDE DISTRIBUTED FILE SYSTEM MODEL" the contents and teachings of which are hereby incorporated herein by reference in their entirety.

The WWJob class 155 is an abstract class representing entities that, in addition to exhibiting the properties of the Job class 150, its sub-activities can be executed across Clusters, in the context of a Sky across Clouds, described in greater details in U.S. patent application Ser. No. 13/435,009, filed Mar. 30, 2012, entitled "WORLDWIDE DISTRIBUTED ARCHITECTURE MODEL AND MANAGEMENT," the contents and teachings of which are hereby incorporated herein by reference in their entirety. The WWJob class 155 represents an activity that can be executed on a Domain, typically Big Data, where parts of the data are stored in Disks inside Nodes of multiple Clusters in the context of a Sky. Typically, a WWJob 165 comprises WWTasks 165 and some of these WWTasks 165 can be executed in parallel on the different parts of the data.

The WWMap class 166 is an abstract class representing entities that, in addition to exhibiting the properties of the WWTask class 165, describe an activity that takes as input a Mapper function and the pointer to data and it returns a list of <key, value> pairs. For <key, value> pairs with the same key, it may return a <key, <value-list>> pair, where <value-list> consists of a list of comma separated values. A WWMap 186 activity may be invoked from outside a Cluster. As illustrated in FIG. 1, the WWMap class 166 exhibits multiple inheritance, inheriting methods and properties from the Map class 161 and the WWTask class 165.

The WWReduce class 167 is an abstract class representing entities that, in addition to exhibiting the properties of the WWTask class 165, describe an activity that takes as input a Reduce function, and a list of <key, value> pairs, and returns another list of <key, value> pairs. For <key, value> pairs with the same key, it may return a <key, <value-list>> pair, where <value-list> consists of a list of comma separated values. A WWReduce 187 activity may be invoked from outside a Cluster. As illustrated in FIG. 1, the WWReduce class 167 exhibits multiple inheritance, inheriting methods and properties from the Reduce class 162 and the WWTask class 165.

The WWSort class 168 is an abstract class representing entities that, in addition to exhibiting the properties of the WWTask class 165, describe an activity that takes as input a list of <key, value> pairs, a sorting function, and returns a list of <key, value> pairs that have been sorted. There are many types of sort functions. Some may sort only based on the key, others may sort first on the key and then on the value. For <key, value> pairs with the same key, it may return a <key, <value-list>> pair, where <value-list> comprises a list of comma separated values. A WWSort 188 activity may be called outside the context of a Cluster. As illustrated in FIG. 1, the WWSort class 168 exhibits multiple inheritance, inheriting methods and properties from the Sort class 163 and the WWTask class 165.

The WWShuffle class 189 is an abstract class representing entities that, in addition to exhibiting the properties of the WWTask class 165, describe an activity that takes as input a shuffle function, and a list of <key, value> pairs, and returns a <key, <value-list>> pair, where <value-list> comprises a list of comma separated values, and there is only one entry per key. This activity may call the Sort class 163 to first sort the <key, value> pairs and then it shuffles together the values for the same key. A WWShuffle activity may be called outside the context of a Cluster. As illustrated in FIG. 1, the WWShuffle class 189 exhibits multiple inheritance, inheriting methods and properties from the Shuffle class 184 and the WWTask class 165.

Figure 7:
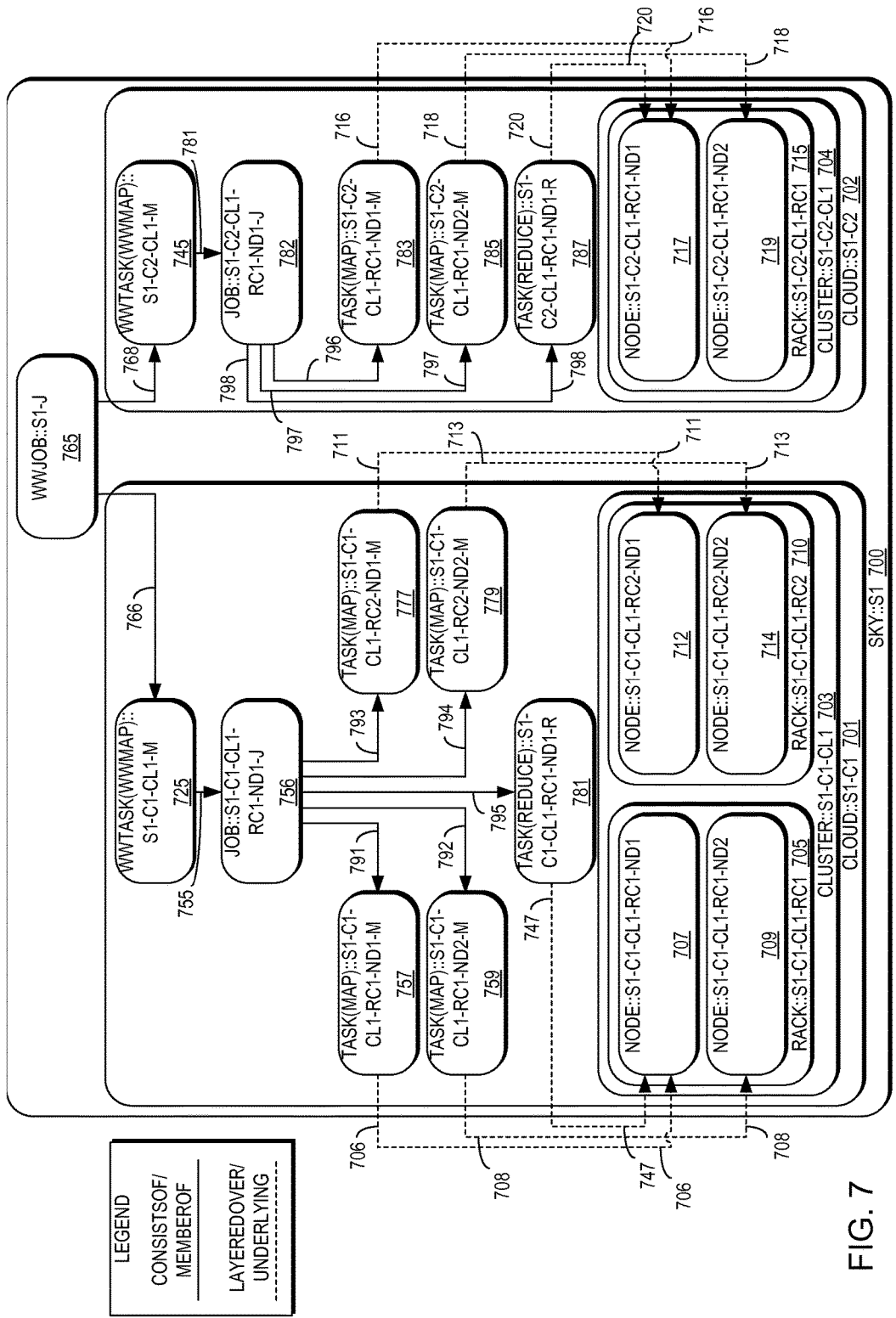
FIG. 7 is a block diagram illustrating relationships between a Sky, comprising two Clouds each comprising a Cluster, the first Cluster comprising two Racks, each Rack comprising two Nodes, and the second Cluster comprising one Rack comprising two Nodes, and computational Tasks of a Worldwide Job assigned to each Node according to an example embodiment of the present invention.

FIG. 7 is a block diagram illustrating relationships between two Clouds (e.g., Cloud S1-C1 701 and Cloud S1-C2 702) and computational Tasks of a WWJob S1-J 765 according to an example embodiment of the present invention. As illustrated in FIG. 7, a Sky S1 700 may comprise the two Clouds 701, 702, each Cloud 701, 702 comprising a Cluster (e.g., Cluster S1-C1-CL1 703 and Cluster S1-C2-CL1 704) and each Cluster 703, 704 having a Job (e.g., Job S1-C1-CL1-RC1-ND1-J 756 and Job S1-C2-CL1-RC1-ND1-J 782, respectively).

As a reminder, each Job 756, 782 ConsistsOf 791-798 a collection of Tasks 757, 759, 777, 779, 781, 783, 785, 787.

For example, Job S1-C1-CL1-RC1-ND1-J 756 ConsistsOf 791-795 Tasks 757, 759, 777, 779, 781 (e.g., Job S1-C1-CL1-RC1-ND1-J 756 ConsistsOf 791 Task(Map) S1-C1-CL1-RC1-ND1-M 757, Job S1-C1-CL1-RC1-ND1-J 756 ConsistsOf 792 Task(Map) S1-C1-CL1-RC1-ND2-M 759, Job S1-C1-CL1-RC1-ND1-J 756 ConsistsOf 793 Task (Map) S1-C1-CL1-RC2-ND1-M 777, Job S1-C1-CL1-RC1-ND1-J 756 ConsistsOf 794 Task(Map) S1-C1-CL1-RC2-ND2-M 779, and Job S1-C1-CL1-RC1-ND1-J 756 ConsistsOf 795 Task(Reduce) S1-C1-CL1-RC1-ND1-R 781). Similarly, Job S1-C2-CL1-RC1-ND1-J ConsistsOf 796-798 Tasks 783, 785, 787 (e.g., Job S1-C2-CL1-RC1-ND1-J ConsistsOf 796 Task(Map) S1-C2-CL1-RC1-ND1-M 783, Job S1-C2-CL1-RC1-ND1-J ConsistsOf 797 Task(Map) S1-C2-CL1-RC1-ND2-M 785, and Job S1-C2-CL1-RC1-ND1-J ConsistsOf 798 Task(Reduce) S1-C2-CL1-RC1-ND1-R 787).

As described above with respect to FIG. 3, for Cluster S1-C1-CL1 703, Task(Map) S1-C1-CL1-RC1-ND1-M 757 may be LayeredOver 706 Node S1-C1-CL1-RC1-ND1 707, Task(Map) S1-C1-CL1-RC1-ND2-M 759 may be LayeredOver 708 Node S1-C1-CL1-RC1-ND2 709, Task(Map) S1-C1-CL1-RC2-ND2-M 777 may be LayeredOver 711 Node S1-C1-CL1-RC2-ND1 714, Task(Map) S1-C1-CL1-RC2-ND2-M 779 may be LayeredOver 713 Node S1-C1-CL1-RC2-ND1 712, and Task(Reduce) S1-C1-CL1-RC1-ND1-R 781 may be LayeredOver 747 Node S1-C1-CL1-RC1-ND1 707. Similarly, for Cluster S1-C2-CL1 704, Task (Map) S1-C2-CL1-RC1-ND1-M 783 may be LayeredOver 716 Node S1-C2-CL1-RC1-ND1 717, Task(Map) S1-C2-CL1-RC1-ND2-M 785 may be LayeredOver 718 Node S1-C2-CL1-RC1-ND2 719, and Task(Reduce) S1-C2-CL1-RC1-ND1-R 787 may be LayeredOver 720 Node S1-C2-CL1-RC1-ND1 717.

It should be noted that, in traditional distributed file system environments, there is no mechanism by which a single query may be performed on multiple domains. Rather, individual queries are needed for each domain with no orchestrated control.

However, in example embodiments of the present invention, each Job (e.g., Job S1-C1-CL1-RC1-ND1-J 756 and S1-C2-CL1-RC1-ND1-J 782) may be mapped to a WWTask (e.g., Job S1-C1-CL1-RC1-ND1-J 756 may be mapped to WWTask(WWMap) S1-C1-CL1-M 725 and Job S1-C2-CL1-RC1-ND1-J 782 may be mapped to WWTask(WW-Map) S1-C2-CL1-M 745). Therefore, each WWTask (e.g., WWTask(WWMap) S1-C1-CL1-M 725 and WWTask(W-WMap) S1-C2-CL1-M 745, respectively) may ConsistOf 726, 746 a Job (e.g., Job S1-C1-CL1-RC1-ND1-J 756 and Job S1-C2-CL1-RC1-ND-1 782, respectively) and further may be a MemberOf 721, 722 a WWJob S1-J 765.

In other words, at the Sky 700 level, a WWJob S1-J 765 is broken into (i.e., ConsistsOf 726, 746) a collection of WWTasks (e.g., WWTask(WWMap) S1-C1-CL1-M 725 and WWTask(WWMap) S1-C2-CL1-M 745) in the context of a Cloud (e.g., Cloud S1-C1-701 and Cloud S1-C2 702, respectively). It should be noted that WWJobs 765 operate at the Sky 700 level and WWTasks 725, 745 operate at the Cloud 701, 702 level. At each Cloud 701, 702, a WWJob S1-J 765 then ConsistsOf 766, 768 WWTasks 725, 745, respectively, each of which may be mapped 755, 781 to a respective Job (e.g., Job S1-C1-CL1-RC1-ND1-J 756 and S1-C2-CL1-RC1-ND1-J 782) (or a collection of Jobs) to be executed in the context of the Clusters 703, 704 in the Cloud 701, 702, such that the WWTask 725, 745 acts as a local client in the Cluster 703, 704 requesting a Job 756, 782 to be executed and receiving the results returned by the Job 756, 782.

Returning to FIG. 1, the model further may be extended to include a WWJobTracker 140 and a WWTaskTracker 155.

A WWJobTracker 140 is an abstract class representing entities that, in addition to exhibiting the properties of a Job class 150, manages one or more WWJobs 155. Instances of the WWJobTracker class 140 can split a Job 160 (i.e., WWJob 165) into a series of Tasks 160 (i.e., WWTasks 165), and assign each WWTask 175 to a WWTaskTracker 155, which reports status back to the WWJobTracker 140. Typically, a WWJobTracker 140 maintains records of all sub-activities executed as part of the WWJob 165, and edit logs to capture the activities. Members of the WWJobTracker class 140 may have a Manages 142 relationship with members of the class WWJob 165, indicating that the instance of WWJobTracker class 140 actually "Manages" the related instance of the class WWJob 165. Further, members of the WWJobTracker class 140 may have a Tracks 132 relationship (i.e., inherited from the Master class 130) with members of the class WWTaskTracker 155, indicating that the instance of the WWJobTracker class 140 actually "Tracks" the related instance of the class WWTaskTracker 155.

A WWTaskTracker 155 is an abstract class representing entities that, in addition to exhibiting the properties of a Task class 170, manage one or more WWTasks 175. Members of the WWTaskTracker class 155 may have a Manages 157 relationship with members of the class WWTask 175, indicating that the instance of the WWTaskTracker class 155 actually "Manages" the related instance of the class WWTask 175. Further, members of the class may have a TrackedBy 132 relationship (i.e., inherited from the Slave class 145) with members of the class WWJobTracker 140, indicating that the instance of WWTaskTracker class 155 actually is "Tracked By" the related instance of the class WWJobTracker 140.

In the context of WWMapReduce, the WWTaskTracker 155 becomes the Master 130 of a JobTracker 135, and the JobTracker 135 becomes the Slave 145 of the WWTaskTracker 155. In other words, the WWTaskTracker 155 is Master 130 of the JobTracker 135 and Slave 145 of the WWJobTracker 140, and the JobTracker 135 is Master 130 of TaskTrackers 150 and Slave 145 of the WWTaskTracker 155. In certain embodiments, the Manages relationship 142, 157 may be refined such that the WWJobTracker class 140 only manages instances of the class WWJob 165 and the WWTaskTracker class 155 only manages instances of the class WWTask 175.

It is important to note that in the traditional MapReduce, Master 130 Roles track Slave 145 Roles only. However, in WWMapReduce, the WWTaskTracker 155 is a Slave 145 of the WWJobTracker 140 and the WWTaskTracker 155 is a Master 130 of the JobTracker 135.

The architecture abstractions and role abstractions for Trackers (e.g., WWJobTrackers 140 and WWTaskTrackers 155) then may be reconciled. The relationship Assumes, and its inverse AssumedBy, represent the different Roles 125 taken by the different architectural components. For example, a relationship Assumes between an instance of the class Architecture Set 115 and an instance of the class Role 125 indicates that the instance of the Architecture Set class 115 is executing the functions associated with the related instance of the class Role 125.

Figure 8:
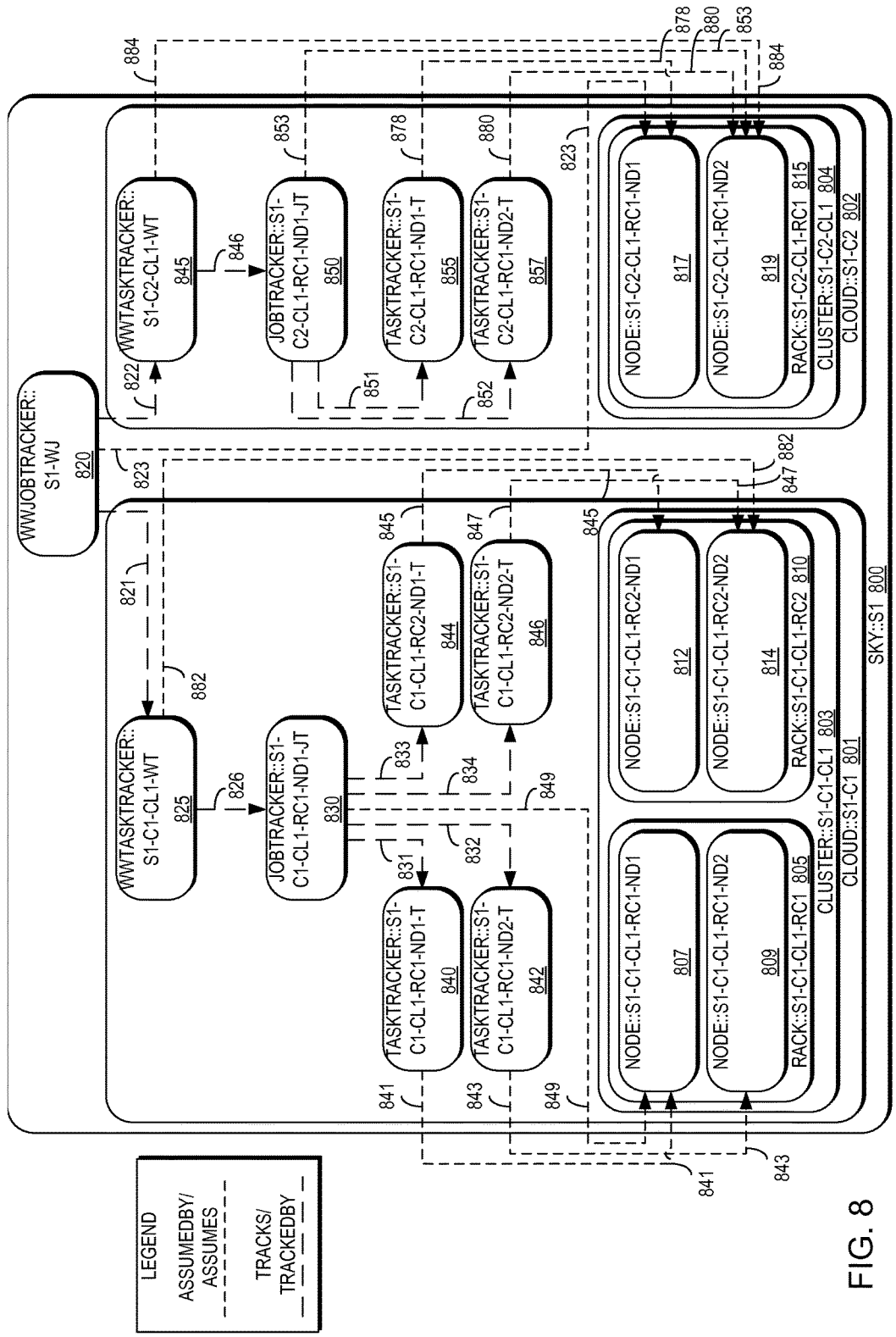
FIG. 8 is a block diagram illustrating relationships between a Sky, comprising two Clouds each comprising a Cluster, the first Cluster comprising two Racks, each Rack comprising two Nodes, and the second Cluster comprising one Rack comprising two Nodes, and Tracker (i.e., WWJobTracker, WWTaskTracker, JobTracker and TaskTracker) functions assumed by the Nodes according to an example embodiment of the present invention.

FIG. 8 is a block diagram illustrating relationships between Clusters (e.g., Cluster S1-C1-CL1 803 and Cluster S1-C1-CL1 804, respectively) and Tracker (i.e., WWJobTracker, WWTaskTracker, JobTracker and TaskTracker) functions according to an example embodiment of the present invention. As illustrated in FIG. 8, a Sky S1 800 may comprise the two Clouds 801, 802, each Cloud 801, 802 comprising a Cluster (e.g., Cluster S1-C1-CL1 803 and Cluster S1-C2-CL1 804) and each Cluster 803, 804 having a JobTracker (e.g., JobTracker S1-C1-CL1-RC1-ND1-JT 830 and JobTracker S1-C2-CL1-RC1-ND1-JT 850). The first Cluster S1-C1-CL1 803 comprises two Racks (e.g., Rack S1-C1-CL1-RC1 805 and Rack S1-C1-CL1-RC2 810), each Rack comprising two Nodes (e.g., Nodes S1-C1-CL1-RC1-ND1 807 and S1-C1-CL1-RC1-ND2 809 and Nodes S1-C1-CL1-RC2-ND1 812 and C1-CL1-RC2-ND2 814), and the second Cluster S1-C2-CL1 804 comprises one Rack S1-C2-CL1-RC1 815 comprising two Nodes (e.g., Nodes S1-C2-CL1-RC1-ND1 817 S1-C2-CL1-RC1-ND2 819).

In a preferred embodiment, a Node in a Cluster (e.g., Node S1-C1-CL1-RC2-ND2 814 in Cluster S1-C1-CL1 803 and Node S1-C2-CL1-RC1-ND2 819 in Cluster S1-C2-CL1 804) in each of the Clouds S1-C1 801 and S1-C2 802 Assumes 882, 884 the Role of a WWTaskTracker (e.g., WWTaskTracker S1-C1-CL1-WT 825 and WWTaskTracker S1-C2-CL1-WT 845). Further, a Node in a Cluster (e.g., Node S1-C2-CL1-RC1-ND1 817) in one of the Clouds 801, 802 Assumes 823 the Role of a WWJobTracker S1-WJ 820.

From a WWMapReduce perspective, the presence of a WWTaskTracker (e.g., WWTaskTracker S1-C1-CL1-WT 825 in Cluster S1-C1-CL1 803 and WWTaskTracker S1-C2-CL1-WT 845 in Cluster S1-C2-CL1 804) turns the Cluster 803, 804 into a Cloud (e.g., Cloud S1-C1 801 and Cloud S1-C2 802). The Cloud 801, 802 is now enabled to become one of the "WW Task Clusters" in executing a "WWTask." The WWTaskTrackers S1-C1-CL1-WT 825 and S1-C2-CL1-WT 845 are TrackedBy a WWJobTracker S1-WJ 820.

In certain embodiments, the WWTaskTracker (e.g., WWTaskTracker S1-C1-CL1-WT 825 and WWTaskTracker S1-C2-CL1-WT 845) causes the Cluster (e.g., Cluster S1-C1-CL1 803 and Cluster S1-C2-CL1 804) to become a WWTask location in the Sky S1 800 (i.e., the Node or Cluster that is executing a particular task). It makes the Cluster (e.g., Cluster S1-C1-CL1 803 and Cluster S1-C2-CL1 804) a WWTaskTracker (e.g., WWTaskTracker S1-C1-CL1-WT 825 and WWTaskTracker S1-C2-CL1-WT 845). In a preferred embodiment, there is at least one WWTaskTracker per Cloud. When there is more than one WWTaskTracker per Cloud, one may be selected as a primary and all others may be secondary, meaning that the primary is responsible to handle functions of a TaskTracker while the others may operate as back up in case of failures.

A WWJobTracker S1-WJ 820 turns a Cloud (e.g., Cloud S1-C1 801 and Cloud S1-C2 802) or a collection of Clouds 801, 802 into a Sky S1 800. A WWJobTracker operates outside of a Cluster. In a preferred embodiment, a relationship Tracks 821, 822 is created between the WWJobTracker S1-WJ 820 and the WWTaskTrackers (e.g., WWTaskTracker S1-C1-CL1-WT 825 and WWTaskTracker S1-C2-CL1-WT 845) to execute functions. Therefore, a WWTaskTracker may become the "portal" for many Clusters that are located in close proximity, with high speed connections. In this case, the WWTaskTracker (e.g., WWTaskTracker S1-C1-CL1-WT 825 and WWTaskTracker S1-C2-CL1-WT 845) Tracks 826, 846 the JobTrackers 830, 850 (e.g., WWTaskTracker S1-C1-CL1-WT 825 Tracks 826 JobTracker S1-C1-CL1-RC1-ND1-JT 830 and WWTaskTracker S1-C2-CL1-WT 845 Tracks 846 JobTracker S1-C2-CL1-RC1-ND1-JT 850) of each Cluster 803, 804 in the same Cloud 801, 802. All the Jobs in the Clusters that are part of a WW Activity can then be available through the WWTaskTracker to any WWJob the Cloud participates in.

As described above with respect to FIG. 4, the JobTracker 830, 850 Role (e.g., JobTracker S1-C1-CL1-RC1-ND1-JT 830 and JobTracker S1-C2-CL1-RC1-ND1-JT 850) (i.e., to respectively Manage Job S1-C1-CL1-FL1 953 and Job S1-C2-CL1-FL1 954 as described in greater detail below with respect to FIG. 9) may be AssumedBy 849, 853 Nodes (e.g., JobTracker S1-C1-CL1-RC1-ND1-JT 830 may be AssumedBy Node S1-C1-CL1-RC1-ND1 807 and JobTracker S1-C2-CL1-RC1-ND1-JT 850 may be AssumedBy Node S1-C2-CL1-RC1-ND2 817).

Similarly, TaskTrackers 840, 842, 844, 846, 855, 857 may be respectively running on the Nodes 807, 809, 812, 814, 817, 819 (e.g., TaskTracker C1-CL1-RC1-ND1-T 840 may be AssumedBy 841 Node S1-C1-CL1-RC1-ND1 807, TaskTracker C1-CL1-RC1-ND2-T 842 may be AssumedBy 843 Node S1-C1-CL1-RC1-ND2 809, TaskTracker S1-C1-CL1-RC2-ND1-T 844 may be AssumedBy 845 Node S1-C1-CL1-RC1-ND1 812, and TaskTracker C1-CL1-RC2-ND2-T 846 may be AssumedBy 847 Node S1-C1-CL1-RC2-ND2 814, and TaskTracker S1-C2-CL1-RC1-ND1-T 855 may be AssumedBy 878 Node S1-C2-CL1-RC1-ND1 817 and TaskTracker S1-C2-CL1-RC1-ND2-T 857 may be AssumedBy 880 Node S1-C2-CL1-RC1-ND2 819.

As described above with respect to FIG. 1, the JobTrackers 830, 850 Track 831-834, 851, 852 each of the TaskTrackers 840, 842, 844, 846, 878, 880 (e.g., JobTracker S1-C1-CL1-RC1-ND1-JT 830 Tracks 831 TaskTracker S1-C1-CL1-RC1-ND1-T 840, JobTracker S1-C1-CL1-RC1-ND1-JT 830 Tracks 832 TaskTracker S1-C1-CL1-RC1-ND2-T 842, JobTracker S1-C1-CL1-RC1-ND1-JT 830 Tracks 833 TaskTracker S1-C1-CL1-RC2-ND1-T 844, and JobTracker S1-C1-CL1-RC1-ND1-JT 830 Tracks 834 TaskTracker S1-C1-CL1-RC2-ND2-T 846, and JobTracker S1-C2-CL1-RC1-ND1-JT 850 Tracks 851 TaskTracker S1-C2-CL1-RC1-ND1-T 855 and JobTracker S1-C2-CL1-RC1-ND1-JT 850 Tracks 852 TaskTracker S1-C2-CL1-RC1-ND2-T 857).

Further, as described above with respect to FIG. 4, the TaskTrackers 840, 842, 844, 846, 855, 857 may be running on the Nodes 807, 809, 812, 814, 817, 819 (e.g., TaskTracker S1-C1-CL1-RC1-ND1-T 840 may be AssumedBy 841 Node S1-C1-CL1-RC1-ND1 807, TaskTracker C1-CL1-RC1-ND2-T 842 may be AssumedBy 843 Node S1-C1-CL1-RC1-ND2 809, TaskTracker S1-C1-CL1-RC2-ND1-T 844 may be AssumedBy 845 Node S1-C1-CL1-RC1-ND1 812, and TaskTracker C1-CL1-RC2-ND2-T 846 may be AssumedBy 847 Node S1-C1-CL1-RC2-ND2 814, and TaskTracker S1-C2-CL1-RC1-ND1-T 855 may be AssumedBy 878 Node S1-C2-CL1-RC1-ND1 817 and TaskTracker S1-C2-CL1-RC1-ND2-T 857 may be AssumedBy 880 Node S1-C2-CL1-RC1-ND2 819.

Figure 9:
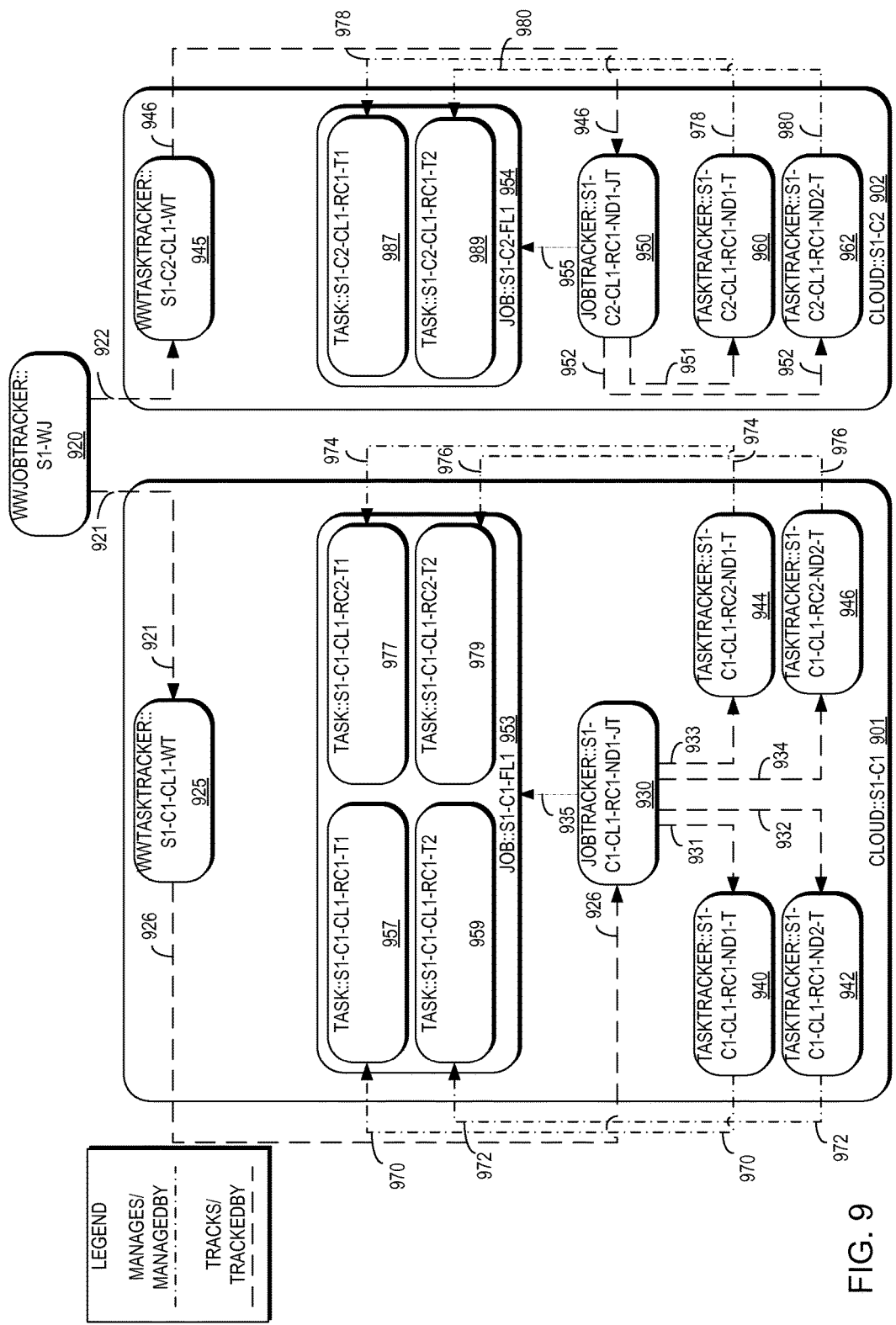
FIG. 9 is a block diagram illustrating relationships between Tasks of a Worldwide Job and Tracker (i.e., WWJobTracker, WWTaskTracker, JobTracker and TaskTracker) functions according to an example embodiment of the present invention.

FIG. 9 is a block diagram illustrating relationships between Tasks 957, 959, 977, 979, 987, 989 of a WWJob (not shown) and Tracker (i.e., WWJobTracker, WWTaskTracker, JobTracker and TaskTracker) functions 920, 925, 930, 940, 942, 944, 945, 946, 950, 960, 962 according to an example embodiment of the present invention. In a preferred embodiment, a relationship Tracks 921, 922 is created between the WWJobTracker S1-WJ 920 and the WWTaskTrackers 925, 945 (e.g., WWJobTracker S1-WJ 920 Tracks 921 WWTaskTracker S1-C1-CL1-WT 925 in Cloud S1-C1 901 and WWJobTracker S1-WJ 920 Tracks 922 WWTaskTracker S1-C2-CL1-WT 945 in Cloud S1-C2 902) to execute functions. In this case, the WWTaskTrackers 925, 945 Tracks 926, 946 the JobTracker 930, 950 of each Cloud (e.g., WWTaskTracker S1-C1-CL1-WT 925 Tracks 926 Job Tracker S1-C1-CL1-RC1-ND1-JT 930 and WWTask-Tracker S1-C2-CL1-WT 945 Tracks 946 JobTracker S1-C2-RC1-ND2-JT 950). Accordingly, all the Jobs 953, 954 the Clouds 901, 902 that are part of a WW Activity can then be available through the WWTaskTracker to any WWJob the Cloud participates in.

The JobTrackers (e.g., JobTracker S1-C1-CL1-RC1-ND1-JT 930 and JobTracker S1-C2-CL1-RC1-ND1-JT 950) may respectively Track 931-934, 951, 952 TaskTrackers (e.g., JobTracker S1-C1-CL1-RC1-ND1-JT 930 Tracks 931 TaskTracker S1-C1-CL1-RC1-ND1-T 940, JobTracker S1-C1-CL1-RC1-ND1-JT 930 Tracks 932 TaskTracker S1-C1-CL1-RC1-ND2-T 942, JobTracker S1-C1-CL1-RC1-ND1-JT 930 Tracks 933 TaskTracker S1-C1-CL1-RC2-ND1-T 944 and JobTracker S1-C1-CL1-RC1-ND1-JT 930 Tracks 934 TaskTracker S1-C1-CL1-RC2-ND2-T 946, and JobTracker S1-C2-CL1-RC1-ND1-JT 950 Tracks 951 TaskTracker S1-C2-CL1-RC1-ND1-T 960 and JobTracker S1-C2-CL1-RC1-ND1-JT 950 Tracks 952 TaskTracker S1-C2-CL1-RC1-ND2-T 962).

Likewise, the TaskTrackers 940, 942, 944, 946, 960, 962 Manage 970, 972, 974, 976, 978, 980 the Tasks 957, 959, 977, 979, 987, 989 of the Job 953, 954 (e.g., for Job S1-C1-FL1 953, TaskTracker S1-C1-CL1-RC1-ND1-T 940 Manages 970 Task S1-C1-CL1-RC1-T1 957, TaskTracker S1-C1-CL1-RC1-ND2-T 942 Manages 972 Task S1-C1-CL1-RC1-T2 959, TaskTracker S1-C1-CL1-RC2-ND1-T 944 Manages 974 Task S1-C1-CL1-RC2-T1 977 and Task-Tracker S1-C1-CL1-RC2-ND2-T 946 Manages 976 Task S1-C1-CL1-RC2-T2 979, and for Job S1-C2-FL1 954 Task-Tracker S1-C2-CL1-RC1-ND1-T 960 Manages 978 Task S1-C2-CL1-RC1-T1 987 and TaskTracker S1-C2-CL1-RC1-ND2-T 962 Manages 980 Task S1-C2-CL1-RC1-T2 989.

Figure 10A:
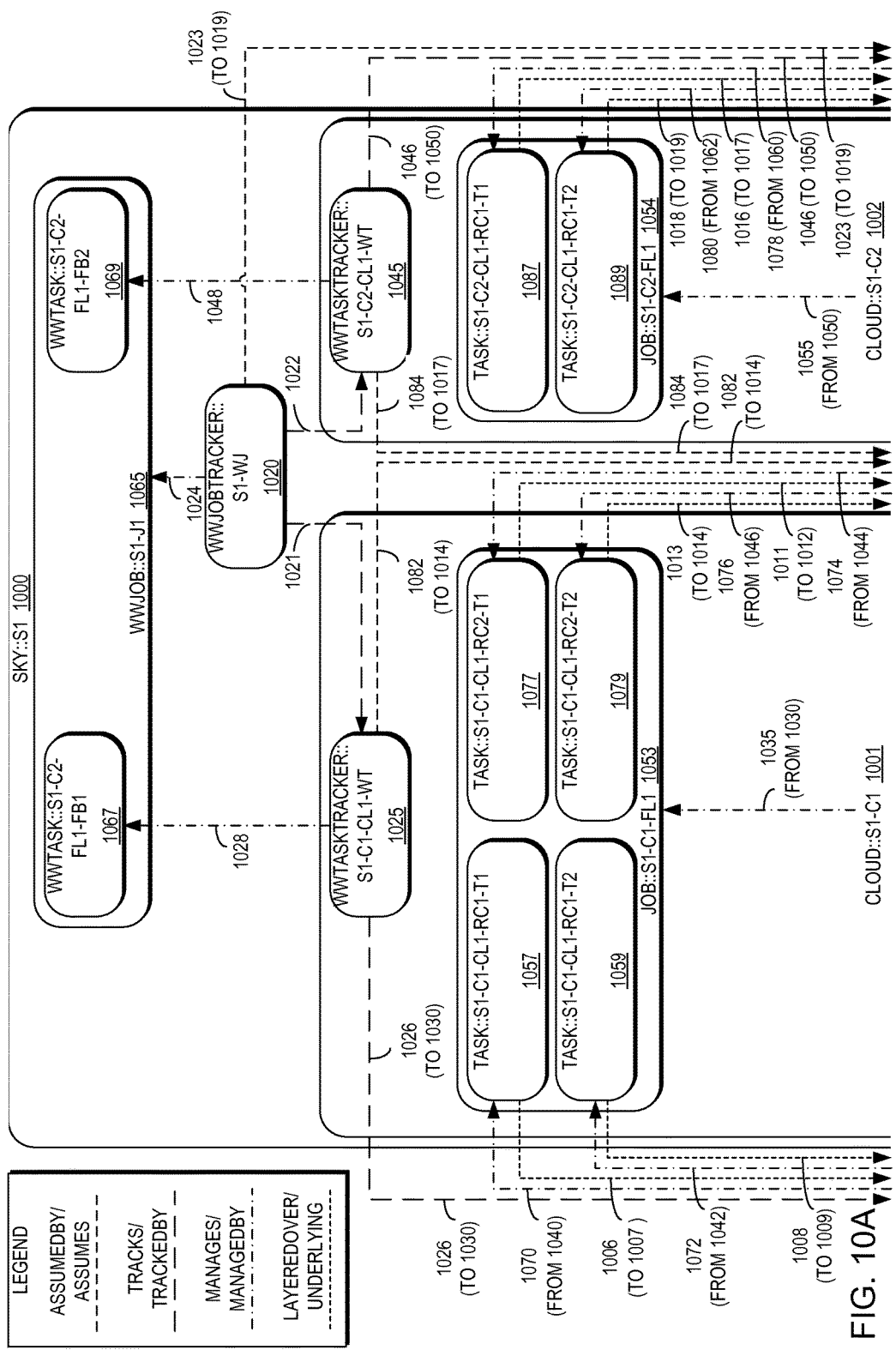
FIGS. 10A-10B are a block diagram illustrating relationships between Tasks of a Worldwide Job and Tracker (i.e., WWJobTracker, WWTaskTracker, JobTracker and TaskTracker) functions and between the Tracker functions and respective Clusters, comprising Racks comprising two Nodes according to an example embodiment of the present invention.
Figure 10B:
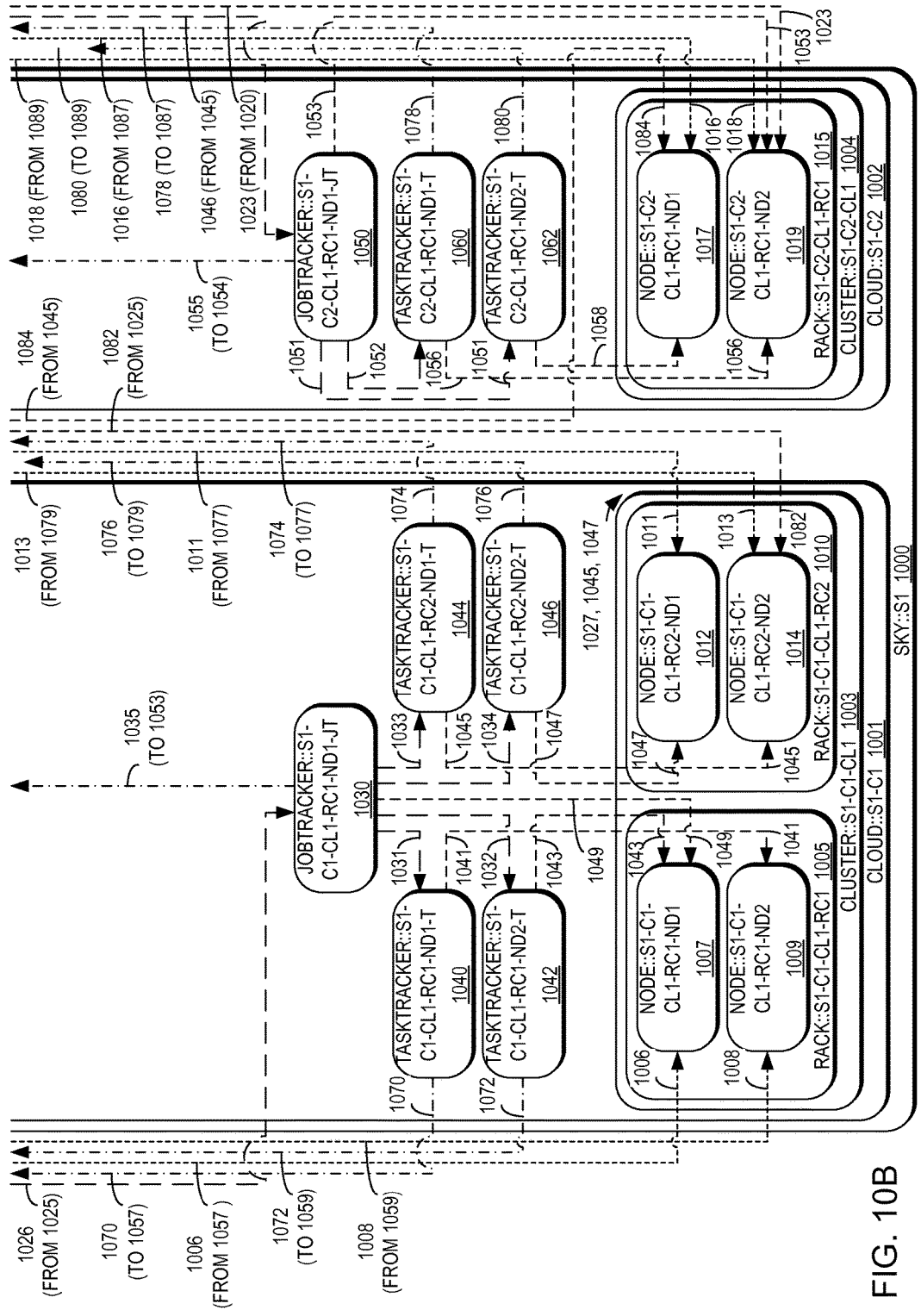

FIGS. 10A-10B are a block diagram illustrating relationships between Tasks 1057, 1059, 1077, 1079, 1087, 1089, Tracker (i.e., WWJobTracker, WWTaskTracker, JobTracker and TaskTracker) functions 1020, 1025, 1030, 1040, 1042, 1044, 1045, 1046, 1050, 1060, 1062, and their respective Nodes 1007, 1009, 1012, 1014, 1017, 1019 according to an example embodiment of the present invention. As illustrated in FIG. 10A, a WWJob S1-J1 1065 comprises two WWTasks 1067, 1069 (e.g., WWTask S1-C2-FL1-FB1 1067 for execution in a first Cloud S1-C1 1001 and WWTask S1-C2-FL1-FB2 1069 for execution in a second Cloud S1-C2 1002, both Clouds being part of the same Sky S1 1000.

In a preferred embodiment, a relationship Manages 1024 is created between a WWJobTracker S1-WJ 1020 and the WWJob S1-J1 1065. Further, a relationship Tracks 1021, 1022 is created between the WWJobTracker S1-WJ 1020 and WWTaskTrackers 1025, 1045 (e.g., WWJobTracker S1-WJ 1020 Tracks 1021 WWTaskTracker S1-C1-CL1-WT 1025 in Cloud S1-C1 1001 and WWJobTracker S1-WJ 1020 Tracks 1022 WWTaskTracker S1-C2-CL1-WT 1045 in Cloud S1-C2 1002) to execute functions. Moreover, a relationship Manages 1028, 1048 is created between the WWTaskTrackers 1025, 1045 and their respective WWTasks 1067, 1069 (e.g., WWTaskTracker S1-C1-CL1-WT 1025 Manages 1028 WWTask S1-C2-FL1-FB1 1067 and WWTaskTracker S1-C2-CL1-WT 1045 Manages 1048 WWTask S1-C2-FL1-FB2 1069).

As illustrated in FIG. 10A and spanning to FIG. 10B, a relationship Tracks 1026, 1046 also is created between the WWTaskTrackers 1025, 1045 and their respective Job-Trackers 1030, 1050 in each Cluster 1003, 1004 (e.g., WWTaskTracker S1-C1-CL1-WT 1025 Tracks 1026 Job-Tracker S1-C1-CL1-RC1-ND1-JT 1030 and WWTask-Tracker S1-C2-CL1-WT 1045 Tracks 1046 JobTracker S1-C2-CL1-RC1-ND1-JT 1050). As illustrated in FIG. 10B and returning to FIG. 10A, a relationship Manages 1035, 1055 is created between the JobTrackers 1030, 1050 and the respective Jobs 1053, 1054 (e.g., JobTracker S1-C1-CL1-RC1-ND1-JT 1030 Manages 1035 Job S1-C1-FL1 1053 and JobTracker S1-C2-CL1-RC1-ND1-JT 1050 Manages 1055 Job S1-C2-FL1 1054).

Returning to FIG. 10B, a relationship Tracks 1031-1034, 1051, 1052 is created between the JobTrackers 1030, 1050 and the respective TaskTrackers 1040, 1042, 1044, 1046, 1060, 1062 (e.g., JobTracker S1-C1-CL1-RC1-ND1-JT 1030 Tracks 1031 TaskTracker S1-C1-CL1-RC1-ND1-T 1040, JobTracker S1-C1-CL1-RC1-ND1-JT 1030 Tracks 1032 TaskTracker S1-C1-CL1-RC1-ND2-T 1042, Job-Tracker S1-C1-CL1-RC1-ND1-JT 1030 Tracks 1033 Task-Tracker S1-C1-CL1-RC2-ND1-T 1044, JobTracker S1-C1-CL1-RC1-ND1-JT 1030 Tracks 1034 TaskTracker S1-C1-CL1-RC2-ND2-T 1046, JobTracker S1-C2-CL1-RC1-ND1-JT 1050 Tracks 1051 TaskTracker S1-C2-CL1-RC1-ND1-T 1060, and JobTracker S1-C2-CL1-RC1-ND1-JT 1050 Tracks 1052 TaskTracker S1-C2-CL1-RC1-ND2-T 1062).

Each of the WWJobTracker 1020, WWTaskTracker 1025, 1045, JobTracker 1030, 1050, and TaskTracker 1040, 1042, 1044, 1046, 1060, 1062 Roles may be AssumedBy 1023, 1041, 1043, 1045, 1047, 1049, 1053, 1056, 1058, 1082, 1084 a respective Node 1007, 1009, 1012, 1014, 1017, 1019 (e.g., WWJobTracker S1-WJ 1020 may be AssumedBy 1023 Node S1-C2-CL1-RC1-ND2 1019, WWTaskTracker S1-C1-CL1-WT 1025 may be AssumedBy 1082 Node S1-C1-CL1-RC2-ND2 1014, WWTaskTracker S1-C2-CL1-WT 1045 may be AssumedBy 1084 Node S1-C2-CL1-RC1-ND1 1017, JobTracker S1-C1-CL1-RC1-ND1-JT 1030 may be AssumedBy 1049 Node S1-C1-CL1-RC1-ND1 1007, JobTracker S1-C2-CL1-RC1-ND1-JT 1050 may be AssumedBy 1053 Node S1-C2-CL1-RC1-ND2 1019, Task-Tracker S1-C1-CL1-RC1-ND1-T 1042 may be AssumedBy 1043 Node S1-C1-CL1-RC1-ND1 1007, TaskTracker S1-C1-CL1-RC1-ND2-T 1040 may be AssumedBy 1041 Node S1-C1-CL1-RC1-ND2 1009, TaskTracker S1-C1-CL1-RC2-ND1-T 1046 may be AssumedBy 1047 Node S1-C1-CL1-RC2-ND1 1012, TaskTracker S1-C1-CL1-RC2-ND2-T 1044 may be AssumedBy 1045 Node S1-C1-CL1-RC2-ND2 1014, TaskTracker S1-C2-CL1-RC1-ND1-T 1062 may be AssumedBy 1058 Node S1-C2-CL1-RC1-ND1 1017, and TaskTracker S1-C2-CL1-RC1-ND2-T 1060 may be AssumedBy 1056 Node S1-C2-CL1-RC1-ND2 1019).

As illustrated in FIG. 10B and spanning to FIG. 10A, a relationship Manages 1070, 1072, 1074, 1076, 1078, 1080 is created between the TaskTrackers 1040, 1042, 1044, 1046, 1060, 1062 and the respective Tasks 1057, 1059, 1077, 1079, 1087, 1089 (e.g., TaskTracker S1-C1-CL1-RC1-ND1-T 1040 Manages 1070 Task S1-C1-CL1-RC1-T1 1057, TaskTracker S1-C1-CL1-RC1-ND2-T 1042 Manages 1072 Task S1-C1-CL1-RC1-T2 1059, TaskTracker S1-C1-CL1-RC2-ND1-T 1044 Manages 1074 Task S1-C1-CL1-RC2-T1 1077, TaskTracker S1-C1-CL1-RC2-ND2-T 1046 Manages 1076 Task S1-C1-CL1-RC2-T2 1079, TaskTracker S1-C2-CL1-RC1-ND1-T 1060 Manages 1078 Task S1-C2-CL1-RC1-T1 1087, and TaskTracker S1-C2-CL1-RC1-ND2-T 1062 Manages 1080 Task S1-C2-CL1-RC1-T2 1089).

Further, as illustrated in FIG. 10A and spanning to FIG. 10B, a relationship LayeredOver 1006, 1008, 1011, 1013, 1016, 1018 is created between the Tasks 1057, 1059, 1077, 1079, 1087, 1089 and the Nodes 1007, 1009, 1012, 1014, 1017, 1019 that execute them (e.g., Task S1-C1-CL1-RC1-T1 1057 is LayeredOver 1006 Node S1-C1-CL1-RC1-ND1 1007, Task S1-C1-CL1-RC1-T2 1059 is LayeredOver 1008 Node S1-C1-CL1-RC1-ND2 1009, Task S1-C1-CL1-RC2-T1 1077 is LayeredOver 1011 Node S1-C1-CL1-RC2-ND1 1012, Task S1-C1-CL1-RC2-T1 1079 is LayeredOver 1013 Node S1-C1-CL1-RC2-ND2 1014, Task S1-C2-CL1-RC1-T1 1087 is LayeredOver 1016 Node S1-C2-CL1-RC1-ND1 1017, and Task S1-C2-CL1-RC1-T2 1089 is LayeredOver 1018 Node S1-C2-CL1-RC1-ND2 1019).

FIGS. 11-14 are flow diagrams illustrating example methods according to example embodiments of the present invention.

As illustrated in FIG. 11, the method includes receiving a WWJob (e.g., WWJob S1-J1 1065 of FIGS. 10A-10B) to perform on a plurality of file systems (1105), and managing the WWJob (1150).

As illustrated in FIG. 12, in certain embodiments, the WWJob may comprise at least one WWTask (e.g., WWTask S1-C2-FL1-FB1 1067 and WWTask S1-C2-FL1-FB2 1069 of FIGS. 10A-10B). Accordingly, in order to manage the WWJob, example embodiments of the present invention may submit each WWTask of the at least one WWTask for execution of the respective WWTask (1210), and receive results of each WWTask of the at least one WWTask as results of the WWJob (1215). Thus, submitting the job comprising each respective WWTask for execution of the job enables performing functions of the WWJob across administrative boundaries between the plurality of file systems. Moreover, the worldwide job may represent an activity that can be executed on a domain, and each WWTask of the at least one WWTask may execute a function on part of the domain.

As illustrated in FIG. 13, in other embodiments, each WWTask (e.g., WWTask S1-C2-FL1-FB1 1067 and WWTask S1-C2-FL1-FB2 1069 of FIGS. 10A-10B) of the at least one WWTask may comprise a respective job (e.g., Job S1-C1-FL1 1053 and Job S1-C2-FL1 1054 of FIGS. 10A-10B). Accordingly, in order to submit each WWTask of the at least one WWTask for execution of the respective WWTask, example embodiments of the present invention may submit the job comprising each respective WWTask for execution of the job (1220), and, in order to receive results of each WWTask of the at least one WWTask as results of the WWJob, may receive results of each respective job as results of each respective WWTask (1225).

As illustrated in FIG. 14, in yet other embodiments, the job may comprise a plurality of tasks. Accordingly, in order to submit the job comprising each respective WWTask for execution of the job, example embodiments of the present invention may submit each task comprising the job for execution of the task (1230), and, in order to receive results of each respective job as results of each respective WWTask, may receive results of each respective task as results of each respective job (1235).

As illustrated in FIG. 15, in still other embodiments, in order to submit each task comprising the job, example embodiments of the present invention may submit each respective task for processing (1240), and, in order to receive results of each respective task as results of each respective job, may receive results of each respective task (1245).

The methods and apparatus of this invention may take the form, at least partially, of program code (i.e., instructions) embodied in tangible non-transitory media, such as floppy diskettes, CD-ROMs, hard drives, random access or read only-memory, or any other machine-readable storage medium.

Figure 16:
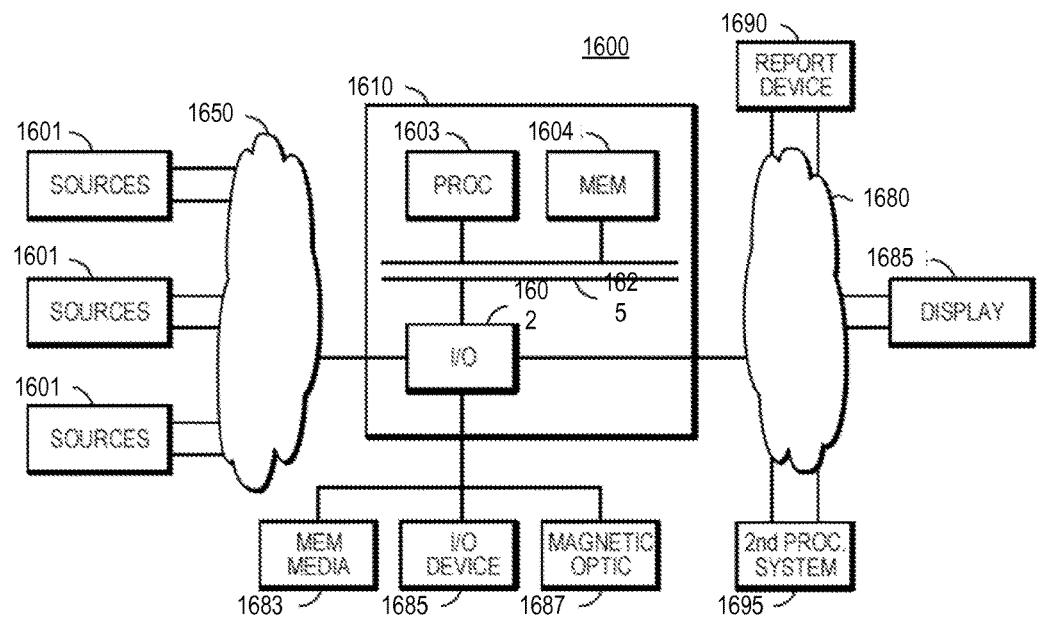
FIG. 16 is a block diagram illustrating an apparatus that may utilize the techniques described herein according to an example embodiment of the present invention.

FIG. 16 is a block diagram illustrating an apparatus, such as a computer 1610 in a network 1600, that may utilize the techniques described herein according to an example embodiment of the present invention. The computer 1610 may include one or more I/O ports 1602, a processor 1603, and memory 1604, all of which may be connected by an interconnect 1625, such as a bus. The I/O port 1602 may provide connectivity to memory media 1683, I/O devices 1685, and drives 1687, such as magnetic or optical drives. When the program code is loaded into memory 1604 and executed by the computer 1610, the machine becomes an apparatus for practicing the invention. When implemented on one or more general-purpose processors 1603, the program code combines with such a processor to provide a unique apparatus that operates analogously to specific logic circuits. As such, a general purpose digital machine can be transformed into a special purpose digital machine.

Figure 17:
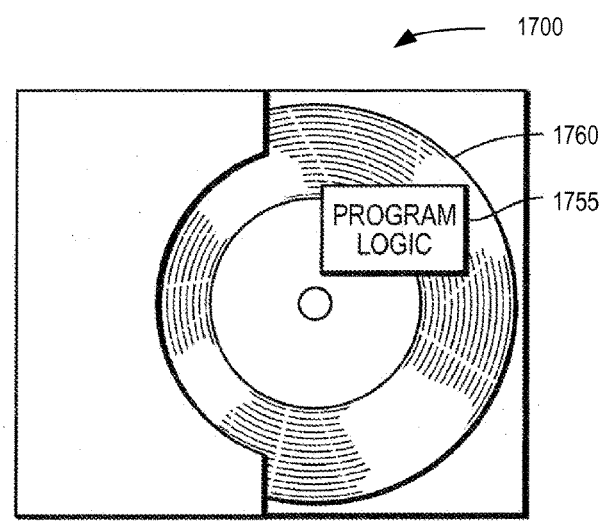
FIG. 17 is a block diagram illustrating a method embodied on a computer readable storage medium that may utilize the techniques described herein according to an example embodiment of the present invention.

FIG. 17 is a block diagram illustrating a method embodied on a computer readable storage medium 1760 that may utilize the techniques described herein according to an example embodiment of the present invention. FIG. 17 shows Program Logic 1755 embodied on a computer-readable medium 1760 as shown, and wherein the Logic is encoded in computer-executable code configured for carrying out the methods of this invention and thereby forming a Computer Program Product 1700.

The logic for carrying out the method may be embodied as part of the aforementioned system, which is useful for carrying out a method described with reference to embodiments shown in, for example, FIGS. 1-5. For purposes of illustrating the present invention, the invention is described as embodied in a specific configuration and using special logical arrangements, but one skilled in the art will appreciate that the device is not limited to the specific configuration but rather only by the claims included with this specification.

Although the foregoing invention has been described in some detail for purposes of clarity of understanding, it will be apparent that certain changes and modifications may be practiced within the scope of the appended claims. Accordingly, the present implementations are to be considered as illustrative and not restrictive, and the invention is not to be limited to the details given herein, but may be modified within the scope and equivalents of the appended claims.

In reading the above description, persons skilled in the art will realize that there are many apparent variations that can be applied to the methods and systems described. In the foregoing specification, the invention has been described with reference to specific exemplary embodiments thereof. It will, however, be evident that various modifications and changes may be made to the specific exemplary embodiments without departing from the broader spirit and scope of the invention as set forth in the appended claims. Accordingly, the specification and drawings are to be regarded in an illustrative rather than a restrictive sense.

What is claimed is:
1. A method comprising:
receiving a worldwide job configured to be performed on a heterogeneous worldwide distributed file system across administrative boundaries between data sets stored on and associated with a respective distribute file system of a cluster of a plurality of nodes;

splitting, by a worldwide job tracker, the worldwide job into worldwide tasks configured to be performed on respective data sets;

assigning, by the worldwide job tracker, the worldwide tasks to worldwide task trackers at the respective clusters, wherein each worldwide task tracker maintains records of all sub-activities executed as part of the of the worldwide job and edit logs to capture the activities;

submitting the worldwide tasks as jobs from the worldwide task trackers to job trackers at the respective clusters;

splitting, by the job trackers, each of the jobs into tasks each configured to be performed on a portion of the data set stored on the distributed file system of the respective cluster;

assigning the tasks to task trackers at the respective clusters; and performing parallel processing of the worldwide job on the heterogeneous worldwide distributed file system by executing the tasks across nodes of the respective clusters, wherein the world wide task tracker is a slave of the world wide job tracker, and further wherein the world wide task tracker is a master of the job tracker.

2. The method of claim 1 wherein the worldwide job comprises at least one worldwide task.

3. The method of claim 2
wherein the worldwide job represents an activity that may be executed on a domain; and
wherein each worldwide task of the worldwide job executes a function on a respective part of the domain.

4. The method of claim 2 further comprising:
submitting each worldwide task of the worldwide job for execution; and
receiving results of execution of each worldwide task as results of the worldwide job.

5. The method of claim 4 wherein each worldwide task of the worldwide job comprises at least one job.

6. The method of claim 5
wherein submitting each worldwide task of the worldwide job for execution comprises submitting each job comprising each respective worldwide task for execution; and
wherein receiving results of execution of each worldwide task as results of the worldwide job comprises receiving results of execution of each respective job of each respective worldwide task as results of the worldwide job.

7. The method of claim 6 wherein each job comprises a plurality of tasks.

8. The method of claim 7
wherein submitting each job comprising each respective worldwide task for execution comprises submitting each task comprising each job for execution; and
wherein receiving results of execution of each respective job of each respective worldwide task as results of the worldwide job comprises receiving results of each respective task as results of each respective job.

9. A system comprising:
one or more processors; and
memory storing computer program code that when executed on one or more of the one or more processors causes the system to perform the operation of:
receiving a worldwide job configured to be performed on a heterogenous worldwide distributed file system across administrative boundaries between data sets stored on and associated with a respective distribute file system of a cluster of a plurality of nodes;

splitting, by a worldwide job tracker, the worldwide job into worldwide tasks configured to be performed on respective data sets;

assigning, by the worldwide job tracker, the worldwide tasks to worldwide task trackers at the respective clusters, wherein each worldwide task tracker maintains records of all sub-activities executed as part of the of the worldwide job and edit logs to capture the activities; and submitting the worldwide tasks as jobs from the worldwide task trackers to job trackers at the respective clusters;

splitting, by the job trackers, each of the jobs into tasks each configured to be performed on a portion of the data set stored on the distributed file system of the respective cluster;

assigning the tasks to task trackers at the respective clusters; and performing parallel processing of the worldwide job on the heterogeneous worldwide distributed file system by executing the tasks across nodes of the respective clusters, wherein the world wide task tracker is a slave of the world wide job tracker, and further wherein the world wide task tracker is a master of the job tracker.

10. The system of claim 9 wherein the worldwide job comprises at least one worldwide task.

11. The system of claim 10
wherein the worldwide job represents an activity that may be executed on a domain; and
wherein each worldwide task of the worldwide job executes a function on a respective part of the domain.

12. The system of claim 10 further comprising:
submitting each worldwide task of the worldwide job for execution; and
receiving results of execution of each worldwide task as results of the worldwide job.

13. The system of claim 12 wherein each worldwide task of the worldwide job comprises at least one job.

14. The system of claim 13
wherein submitting each worldwide task of the worldwide job for execution comprises submitting each job comprising each respective worldwide task for execution; and
wherein receiving results of execution of each worldwide task as results of the worldwide job comprises receiving results of execution of each respective job of each respective worldwide task as results of the worldwide job.

15. The system of claim 14 wherein each job comprises a plurality of tasks.

16. The system of claim 15
wherein submitting each job comprising each respective worldwide task for execution comprises submitting each task comprising each job for execution; and
wherein receiving results of execution of each respective job of each respective worldwide task as results of the worldwide job comprises receiving results of each respective task as results of each respective job.

17. A computer program product having a non-transitory computer readable storage medium with instructions encoded thereon that, when executed by a processor of a computer, causes the computer to perform the operations of:

receiving a worldwide job configured to be performed on a heterogeneous worldwide distributed file system across administrative boundaries between data sets stored on and associated with a respective distribute file system of a cluster of a plurality of nodes;

splitting, by a worldwide job tracker, the worldwide job into worldwide tasks configured to be performed on respective data sets;

assigning, by the worldwide job tracker, the worldwide tasks to worldwide task trackers at the respective clusters, wherein each worldwide task tracker maintains records of all sub-activities executed as part of the of the worldwide job and edit logs to capture the activities;

submitting the worldwide tasks as jobs from the worldwide task trackers to job trackers at the respective clusters;

splitting, by the job trackers, each of the jobs into tasks each configured to be performed on a portion of the data set stored on the distributed file system of the respective cluster;

assigning the tasks to task trackers at the respective clusters; and performing parallel processing of the worldwide job on the heterogeneous worldwide distributed file system by executing the tasks across nodes of the respective clusters, wherein the world wide task tracker is a slave of the world wide job tracker, and further wherein the world wide task tracker is a master of the job tracker.

18. The computer program product of claim 17 wherein the worldwide job comprises at least one worldwide task.

19. The computer program product of claim 18 wherein each worldwide task of the worldwide job comprises at least one job.

20. The computer program product of claim 19 wherein each job comprises a plurality of tasks.

\* \* \* \* \*